United States Patent
Janowiak et al.

(10) Patent No.: US 10,737,559 B2
(45) Date of Patent: Aug. 11, 2020

(54) VISOR

(71) Applicant: Irvin Automotive Products, Inc., Pontiac, MI (US)

(72) Inventors: Anthony R. Janowiak, Rochester, MI (US); Leslie Hinds, Oxford, MI (US); Martin Rathsburg, Jr., Clarkston, MI (US); Robert J. Mayne, Jr., Lake Orion, MI (US)

(73) Assignee: Irvin Automotive Products, LLC, Pontiac, MI (US)

( * ) Notice: Subject to any disclaimer, the term of this patent is extended or adjusted under 35 U.S.C. 154(b) by 263 days.

(21) Appl. No.: 14/996,530

(22) Filed: Jan. 15, 2016

(65) Prior Publication Data

US 2016/0167490 A1 Jun. 16, 2016

Related U.S. Application Data

(63) Continuation-in-part of application No. 14/571,980, filed on Dec. 16, 2014, now Pat. No. 10,300,769.

(51) Int. Cl.
*B60J 3/02* (2006.01)
*F21V 8/00* (2006.01)
*B60Q 3/252* (2017.01)

(52) U.S. Cl.
CPC .......... *B60J 3/0282* (2013.01); *B60Q 3/252* (2017.02); *G02B 6/0073* (2013.01)

(58) Field of Classification Search
CPC ...... G02B 6/0073; B60J 3/0282; B60Q 3/004; B60Q 3/0226; B60Q 3/252; B60Q 3/0293
See application file for complete search history.

(56) References Cited

U.S. PATENT DOCUMENTS

| | | | | |
|---|---|---|---|---|
| 4,479,172 A | * | 10/1984 | Connor | B60J 3/0282 362/135 |
| 5,575,552 A | * | 11/1996 | Faloon | B60J 3/0282 359/839 |
| 6,264,352 B1 | * | 7/2001 | Zapinski | B60Q 3/252 362/135 |
| 6,464,381 B2 | | 10/2002 | Anderson, Jr. et al. | |
| 6,499,868 B1 | * | 12/2002 | Kerul, Jr. | B60J 3/0282 362/492 |
| 6,871,990 B2 | | 3/2005 | Imazeki et al. | |
| 7,032,949 B1 | | 4/2006 | Wang et al. | |
| 7,036,965 B2 | | 5/2006 | Dalton, Jr. et al. | |
| 7,201,427 B2 | | 4/2007 | Wang et al. | |
| 7,510,311 B2 | * | 3/2009 | Romas | B60Q 1/2665 362/494 |
| 7,534,018 B2 | * | 5/2009 | Nicola | B60J 3/0282 362/137 |
| 7,559,667 B2 | | 7/2009 | Holderman | |
| 7,677,775 B2 | * | 3/2010 | Oehmann | B60Q 1/2665 340/475 |

(Continued)

*Primary Examiner* — Arman B Fallahkhair
(74) *Attorney, Agent, or Firm* — Raggio & Dinnin, P.C.

(57) ABSTRACT

A visor for use in a vehicle is disclosed. The visor comprises a pivot rod and a carrier arranged over the pivot rod. The visor also comprises a first and second shell being engagable to form a visor body and a vanity arranged therein. The visor also comprises a light base secured to the second shell and a circuit board engaging the light base. The visor also comprises a light emitting diode secured to a surface of the circuit board.

11 Claims, 29 Drawing Sheets

(56) References Cited

U.S. PATENT DOCUMENTS

| | | | |
|---|---|---|---|
| 7,771,062 B2 * | 8/2010 | Kuhn | B60Q 1/2665 |
| | | | 359/839 |
| 7,780,322 B2 | 8/2010 | Muller et al. | |
| 7,862,220 B2 | 1/2011 | Cannon et al. | |
| 7,944,371 B2 * | 5/2011 | Foote | B60Q 1/2665 |
| | | | 340/903 |
| D643,951 S | 8/2011 | Cal | |
| 8,096,688 B2 | 1/2012 | Kino et al. | |
| 8,215,810 B2 | 7/2012 | Welch, Sr. et al. | |
| 8,382,189 B2 * | 2/2013 | Li | B29C 45/1418 |
| | | | 296/97.5 |
| 8,408,773 B2 | 4/2013 | Judge | |
| 8,425,094 B2 * | 4/2013 | Stakoe | B60J 3/0282 |
| | | | 362/135 |
| 8,596,803 B2 | 12/2013 | Schultz et al. | |
| 8,608,355 B2 | 12/2013 | Bruhnke et al. | |
| 2016/0167573 A1 * | 6/2016 | Janowiak | B60J 3/0282 |
| | | | 362/511 |

* cited by examiner

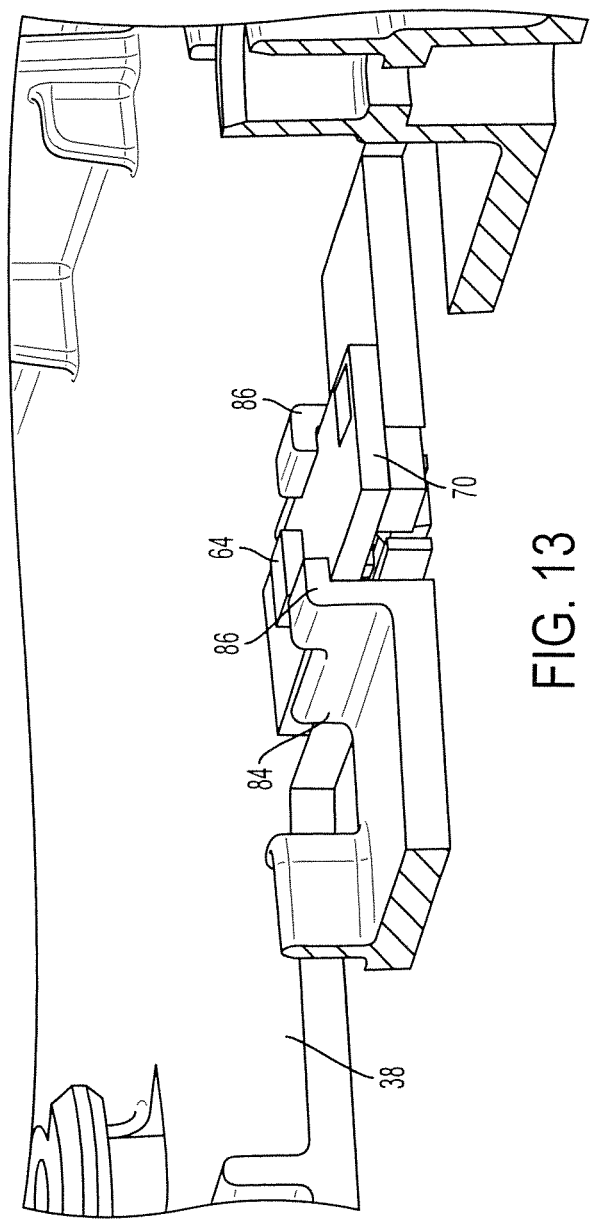
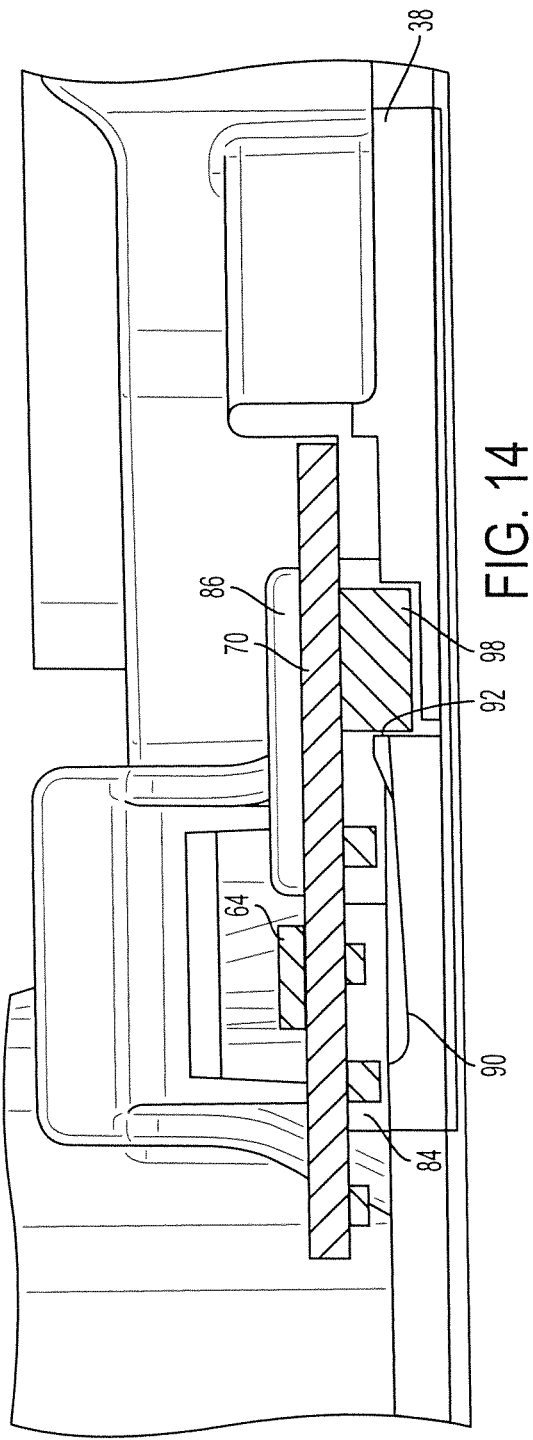
FIG. 13
FIG. 14

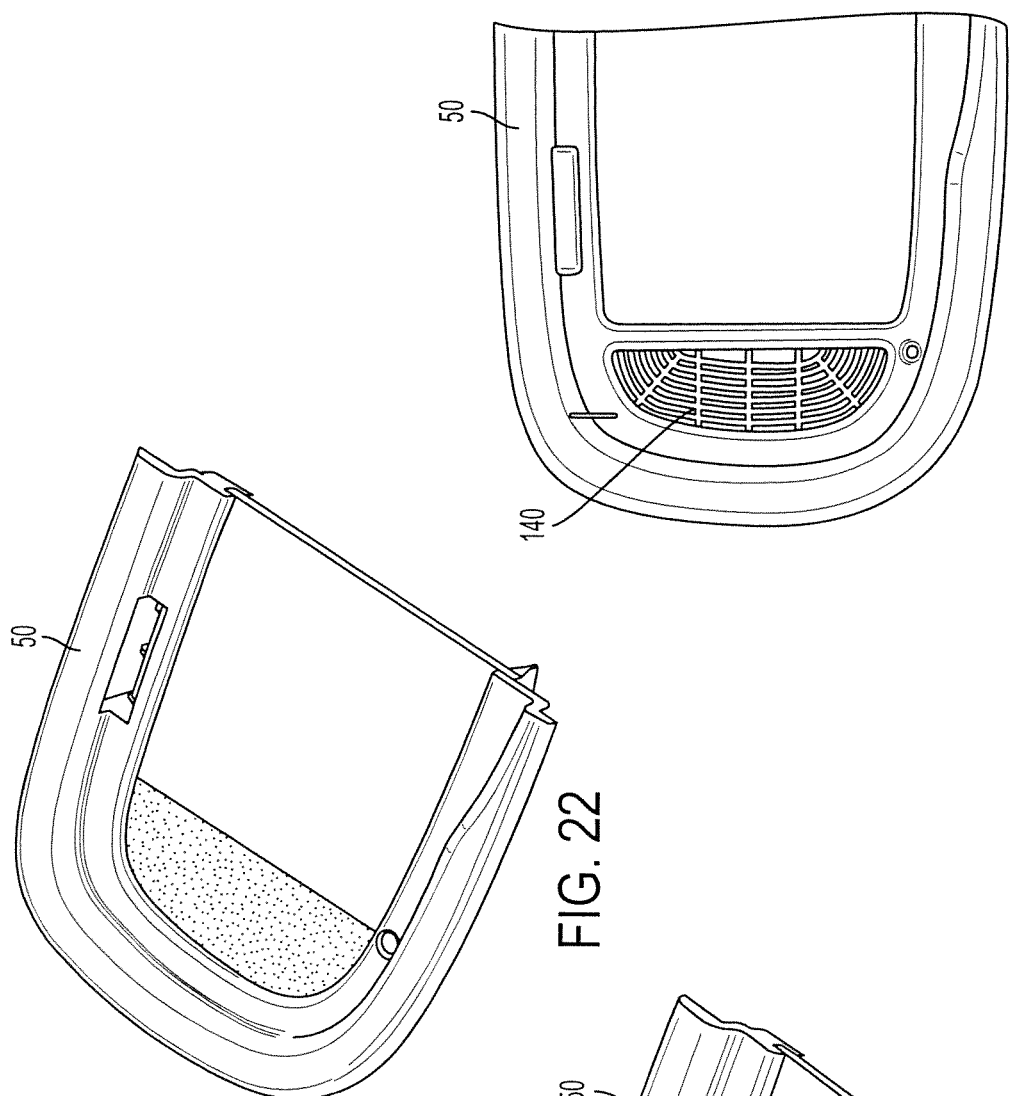
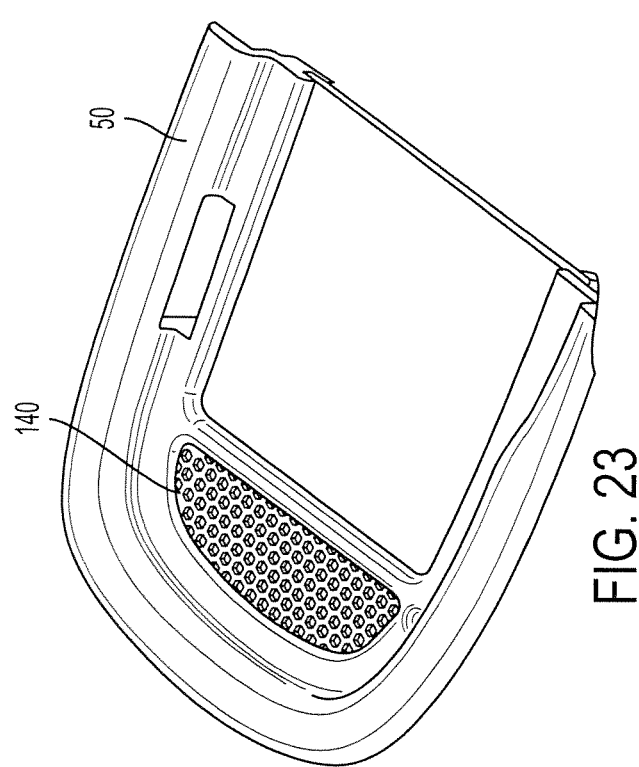

VISOR

This application is a continuation-in-part of pending U.S. patent application Ser. No. 14/571,980—filed Dec. 16, 2014

BACKGROUND OF THE INVENTION

1. Field of the Invention

The present invention generally relates to a sun visor for interior use in a vehicle, and more particularly relates to a sun visor, having a visor body that includes a vanity having a light emitting diode (LED) to provide light therefore.

2. Description of Related Art

Sun visors are well known and widely used in the prior art. Many different types and designs have been successfully employed in vehicles over the years. Many of these prior art visors have been developed in a variety of ways through which visor bodies and other interior components may be constructed and mounted within a vehicle. Advances in design may often add complexities to the manufacturing processes for interior components. There has been and continues to be a premium in the automotive industry on cost savings, weight reduction, and improvements in the efficiency and speed in the manufacturing processes for such components therein. One area of particular focus in the automobile technology field has been reducing the number and the complexity of steps required to assemble interior components such as sun visors or visors for use in a vehicle.

Generally, in the prior art, manufacturing simplicity continues to drive innovations in the automotive industry, loss of quality and performance in manufactured interior components for the sake of facilitating production is seldom, if ever acceptable. There is a substantial body of prior art relating to the specific structure of the visor to provide a strong, lightweight construction that matches or compliments the vehicle interior trim in a cost effective manner. Of particular interest has been the "clamshell" type construction, which involves the molding of two shell pieces or clamshell halves, which are joined to form the visor. In one typical clamshell design, the visor halves are formed as a single piece attached along a longitudinal edge, and then folded to form the visor body. The exterior surface can be molded to provide a suitable visor surface, or a desired outer covering may be added in a variety of ways known in the prior art.

The clamshell design allows the visor body to be constructed relatively quickly and easily, however, the various components that are attached to the visor clamshell halves must in some cases be incorporated with several assembly steps prior to securing the clamshell halves together. For example, several known designs require insertion of additional mounting or journaling pieces for retention of the visor pivot rod within the visor body. The construction of visors having such a design is relatively time-intensive. Moreover, the various slides, journals, retainers, etc., utilized in the construction may add significant expense and weight to the overall visor, along with unwanted noise, and increase the number of components necessary to build one therein. Many of these prior art visors use standard light bulbs, such as incandescent bulbs to provide light for either a vanity which includes a mirror arranged within the visor, or for a map light that is sometimes arranged within the visor. The use of the incandescent bulb draws more current and power than that of newer technologies, such as a LED bulb.

In come cases, eliminating parts may reduce the expense of manufacturing and constructing the visor. Decreasing size and weight, however, can be accompanied by decreases in strength. Furthermore, the visors that attempt to change well accepted technology, like incandescent light bulbs with new technology, such as a LED, may run into problems with consumers and users of the vehicle not accepting the look and feel of the light emitted by an LED versus that of a light emitted by an incandescent prior art light bulb. The use of new technology, such as a LED over a prior art light bulb, may increase the efficiency and reduce manufacturing assembly times for visors in the automotive and other vehicular art. Hence, it is desirable in the art to provide a visor that is light weight, easy to manufacture and uses relatively few components, yet utilizes a design imparting significant durability to withstand heavy and repeated use and to provide a solid construction with tight tolerances throughout the entire system. Furthermore, there is a need in the art for an improved visor that has a LED lighted vanity and/or map light arranged therein. There also is a need in the art for a sun visor that uses a variety of methods of aligning a LED with a lens for use in the vanity or a LED used in conjunction with a light guide in a vanity to provide a more even appearance and distribute the light in a more aesthetic pleasing fashion than prior art light bulbs. There also is a need in the art for a vanity that may use one light to light both sides of a vanity mirror through the use of a light guide system arranged therein.

SUMMARY OF THE INVENTION

One object of the present invention may be that it provides an improved visor.

Another object of the present invention may be that it provides a visor that has a light emitting diode (LED) for use in illuminating a mirror of a vanity.

Yet a further object of the present invention may be that it provides a visor that uses a LED as a direct replacement for a prior art light bulb.

Still another object of the present invention may be that it provides a visor that uses a LED as the light source along with a light guide to illuminate a vanity mirror in a visor.

Still another object of the present invention may be that it provides a visor that includes a light base that is capable of holding a circuit board having a LED thereon in either a horizontal or vertical position.

Yet another object of the present invention may be that it provides a visor that has a map light that is illuminated with a LED.

Still another object of the present invention may be that it provides a visor that includes a wire arranged between a circuit board and the electrical system of the vehicle to provide LED lighting in a visor vanity.

Still another object of the present invention may be to provide a visor that is easier to manufacture and more efficient through the use of a LED lighted vanity.

Still another object of the present invention may be that it provides a visor that is more robust and includes a lighting system that is more reliable and longer lasting than prior art lighting systems.

Yet another object of the present invention may be that it provides a visor that has a frameless vanity with a mirror having clear ends on both ends thereof.

Still another object of the present invention may be that it provides a visor having an LED with a mirror with clear ends arranged at each end thereof.

According to the present invention, the foregoing and other objects and advantages are obtained by a novel design for a visor for use in a vehicle. The visor generally comprises a pivot rod and a carrier arranged over the pivot rod. The visor further comprises a first and second shell engagable to form a visor a body. The visor also comprises a vanity arranged within the visor body. The visor further comprises a light base secured to the second shell of the visor body and a circuit board engaging the light base. The visor also comprises a light emitting diode secured to a surface of the circuit board.

One advantage of the present invention may be that it provides for an improved visor.

A further advantage of the present invention may be that it provides for a visor that uses a LED as the light source for a vanity.

Yet another advantage of the present invention may be that it provides for a direct replacement of a prior art light bulb with a LED arranged on a circuit board for a vanity in a visor.

Yet another advantage of the present invention may be that it provides for a light base for use in a visor that is capable of holding a LED arranged on a circuit board in either a vertical or horizontal position relative to the visor body.

Still another advantage of the present invention may be that it provides a visor that uses a LED in conjunction with a light guide to provide illumination for a vanity.

Still another advantage of the present invention may be that it provides a visor that uses a light base to align a LED in proper position with respect to a vanity therein.

Still another advantage of the present invention may be that it provides a visor that replaces prior art light bulbs with more energy efficient, reliable and longer lasting LED light sources.

Still another advantage of the present invention may be that it provides for a visor that is easier to manufacture and more robust than prior art visors.

Still another advantage of the present invention may be that it provides for a visor that includes a frameless vanity having a mirror with clear ends on both ends thereof.

Yet another advantage of the present invention may be that it provides a visor that uses a LED in conjunction with a mirror having clear ends for use in illuminating the mirror.

Other objects, features and advantages of the present invention will become apparent from the subsequent description and appended claims, taken in conjunction with the accompanying drawings.

BRIEF DESCRIPTION OF THE DRAWINGS

FIG. 13 shows a plan view of a light base according to an alternate embodiment of the present invention.

FIG. 14 shows a section view of a light base according to an alternate embodiment of the present invention.

FIG. 22 shows a vanity lens for use according to the present invention.

FIG. 23 shows a vanity for use according to an alternate embodiment of the present invention.

FIG. 24 shows a vanity for use in an alternate embodiment according to the present invention.

BRIEF DESCRIPTION OF THE EMBODIMENT(S)

Figure 1:
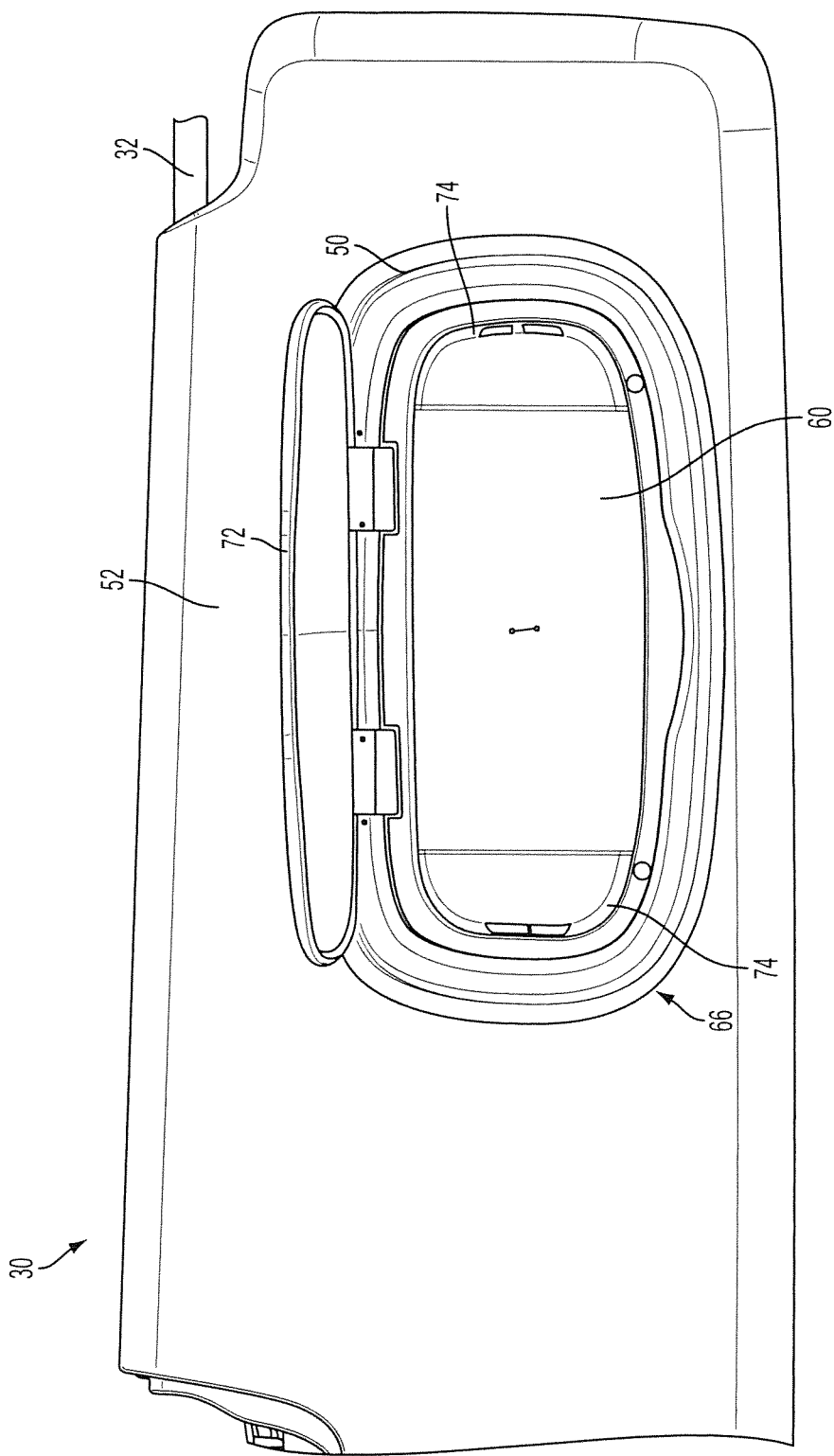
FIG. 1 shows a plan view of a visor according to the present invention.
Figure 2:
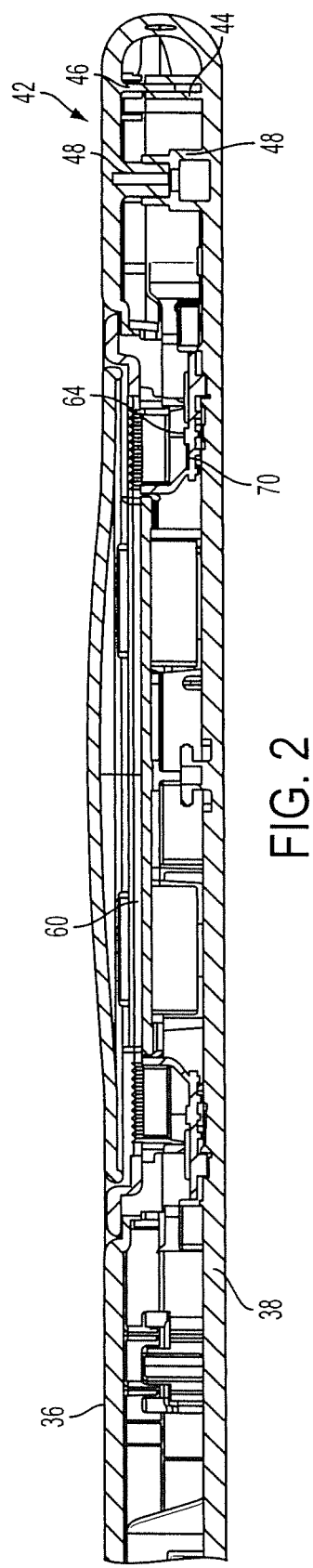
FIG. 2 shows a cross section of a visor according to the present invention.
Figure 3:
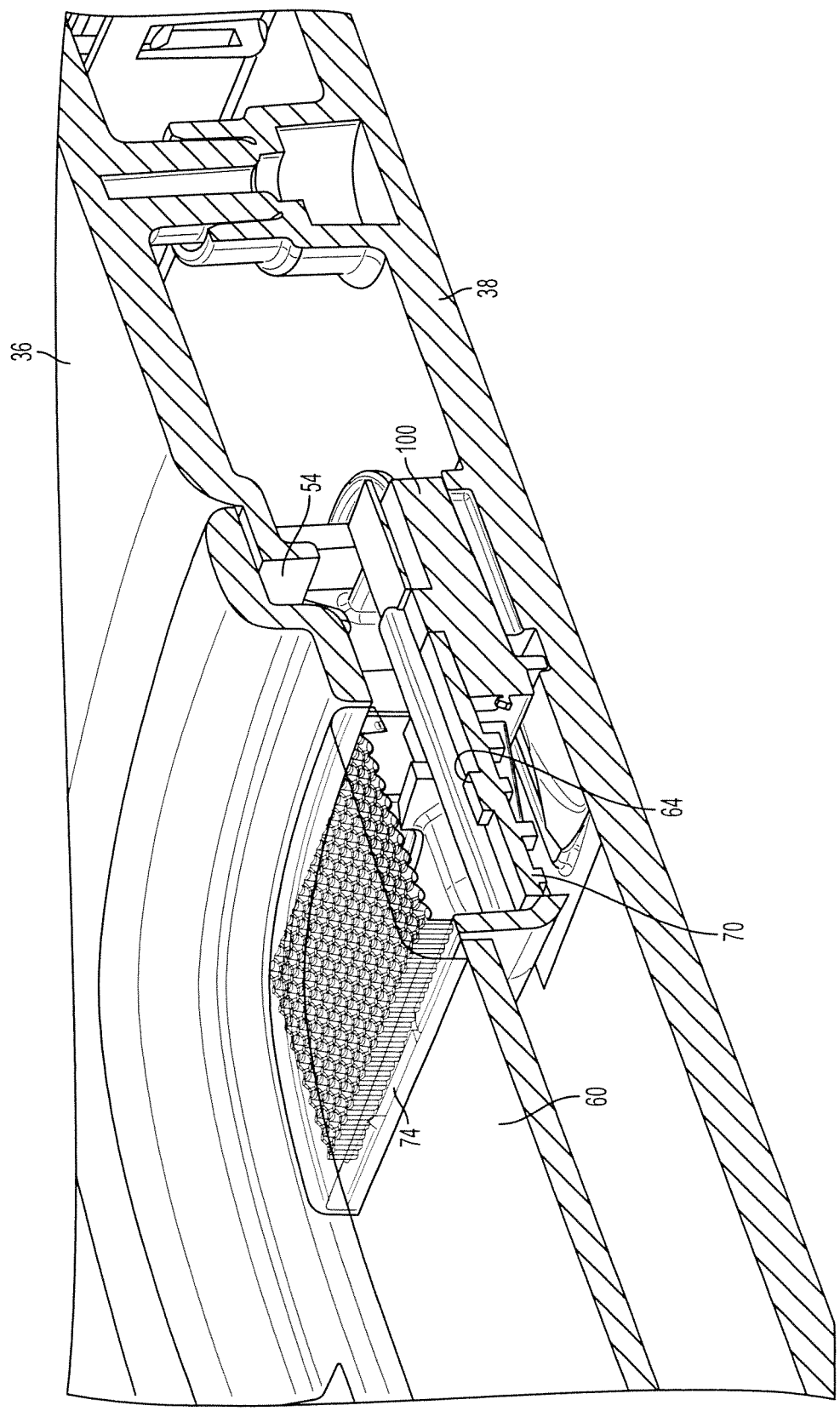
FIG. 3 shows a cross section of a visor according to the present invention.
Figure 4:
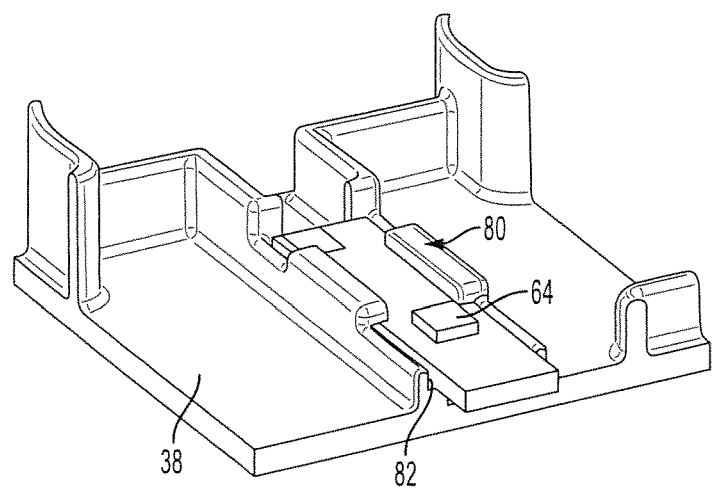
FIG. 4 shows a plan view of a circuit board and LED for use in a visor.
Figure 5:
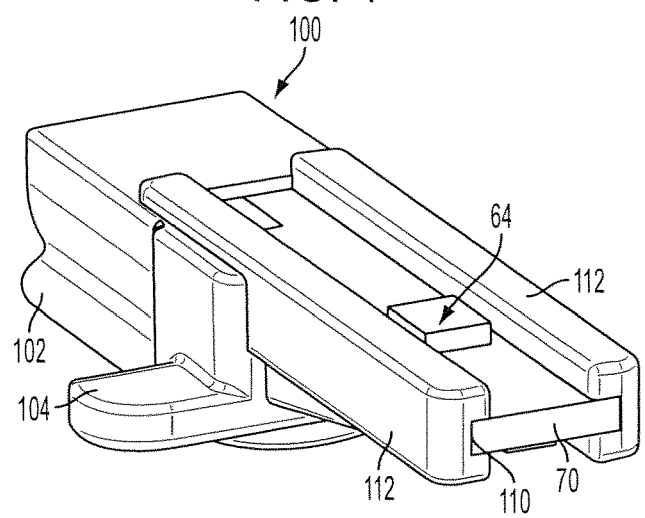
FIG. 5 shows a top view of a light base for use in a visor according to the present invention.
Figure 6:
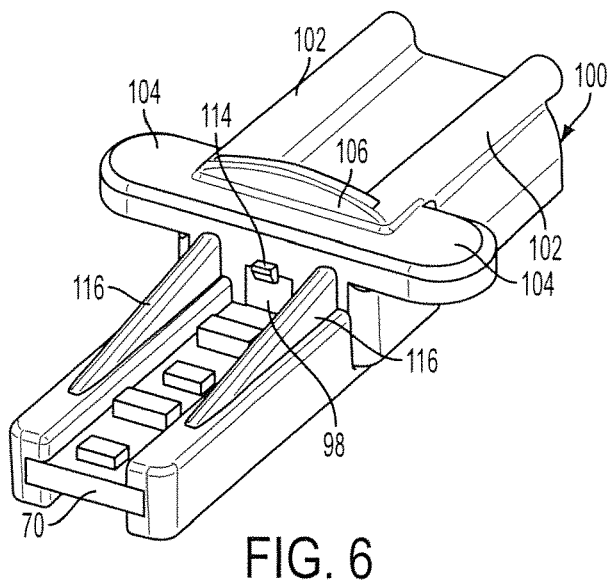
FIG. 6 shows a bottom view of a light base for a visor according to the present invention.
Figure 7:
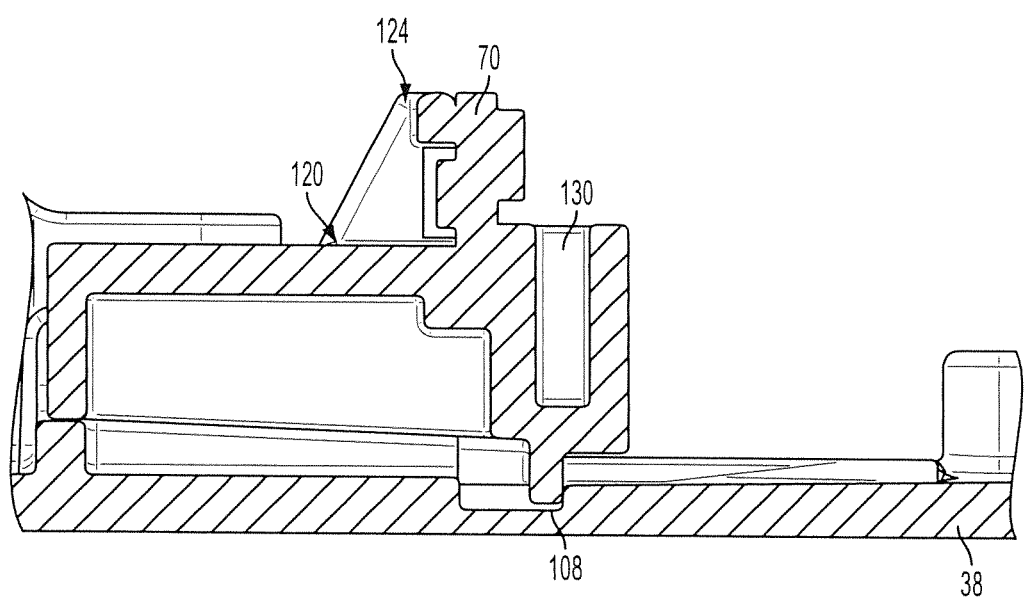
FIG. 7 shows a section view of a visor according to an alternate embodiment of the present invention.
Figure 8:
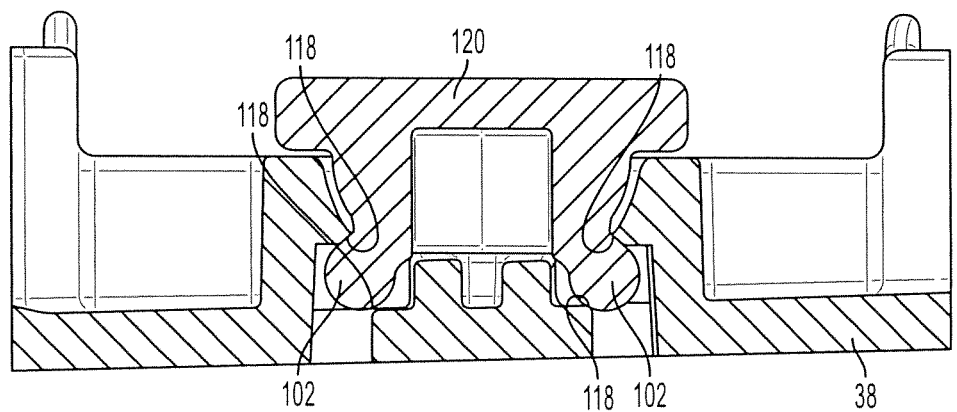
FIG. 8 shows a section view of a visor according to an alternate embodiment of the present invention.
Figure 9:
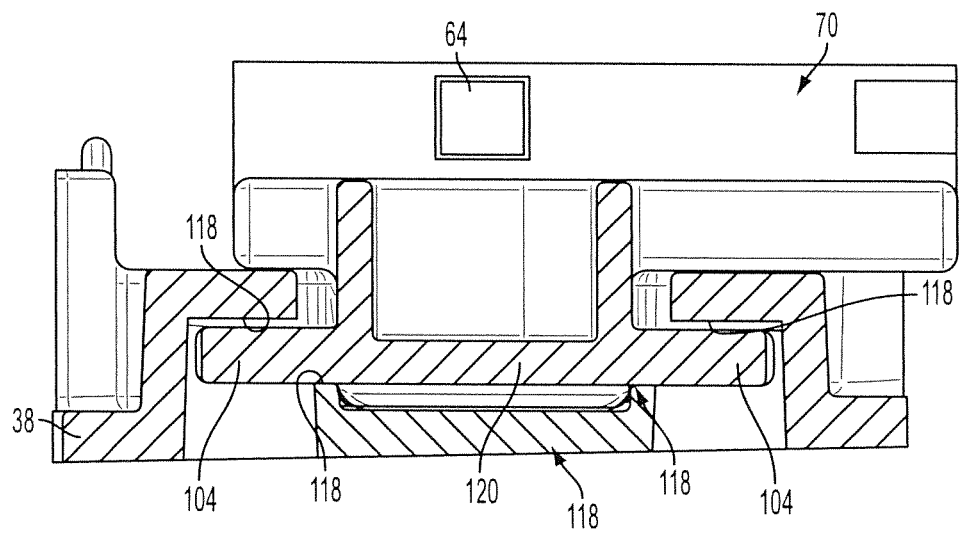
FIG. 9 shows a section of a visor according to an alternate embodiment of the present invention.
Figure 10:
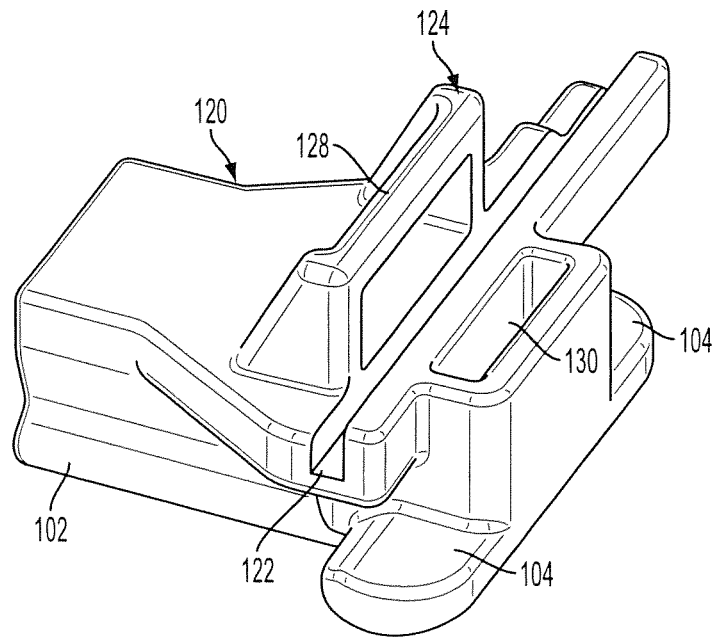
FIG. 10 shows a top view of a light base according to an alternate embodiment of the present invention.
Figure 11:
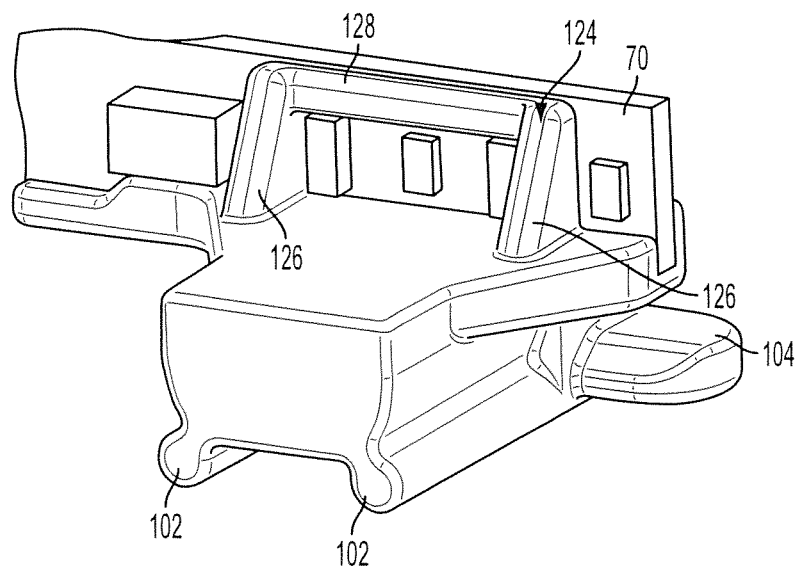
FIG. 11 shows a light base with a circuit board arranged therein according to an alternate embodiment of the present invention.
Figure 12:
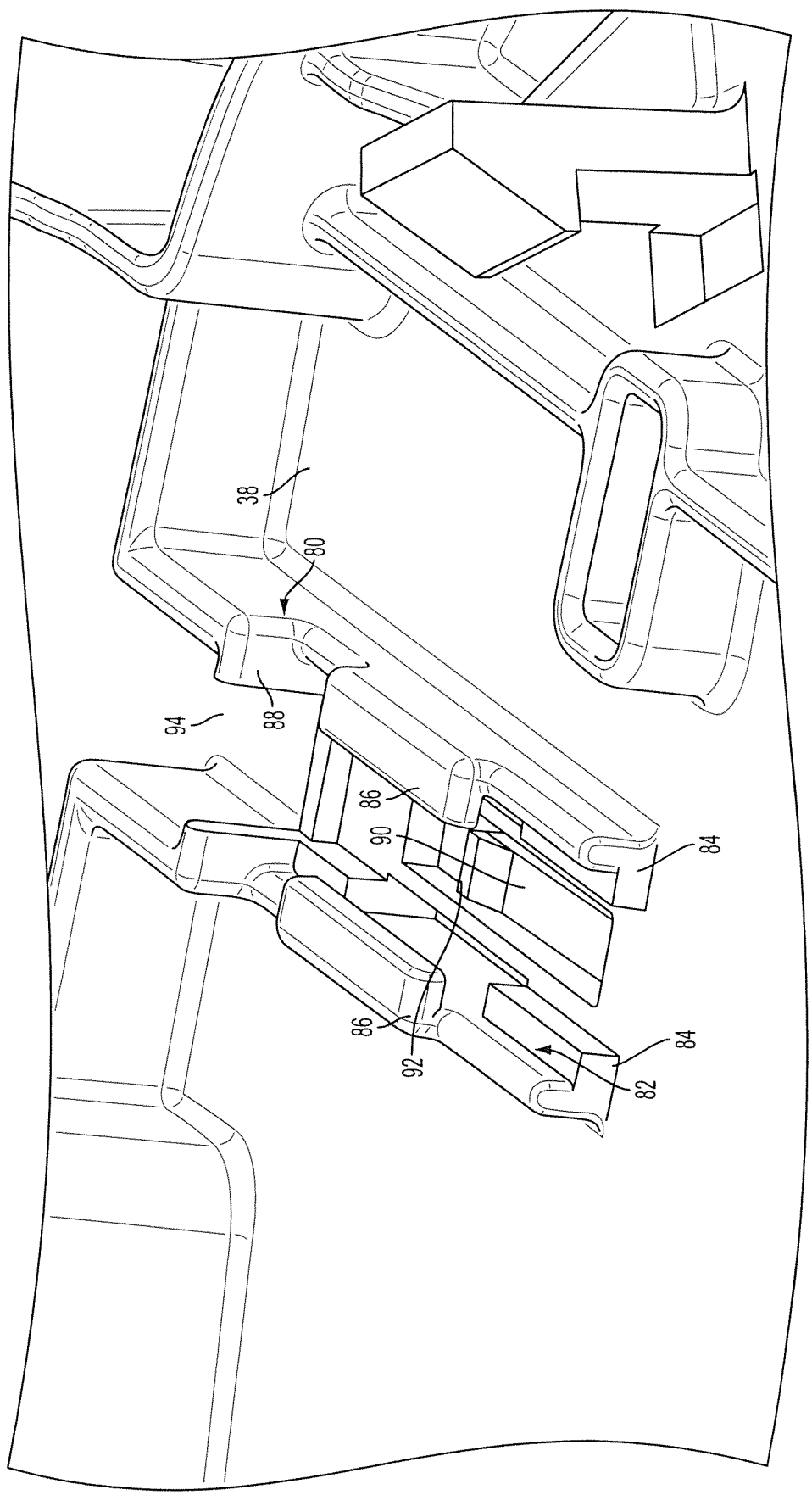
FIG. 12 shows a light base according to an alternate embodiment of the present invention.
Figure 15:
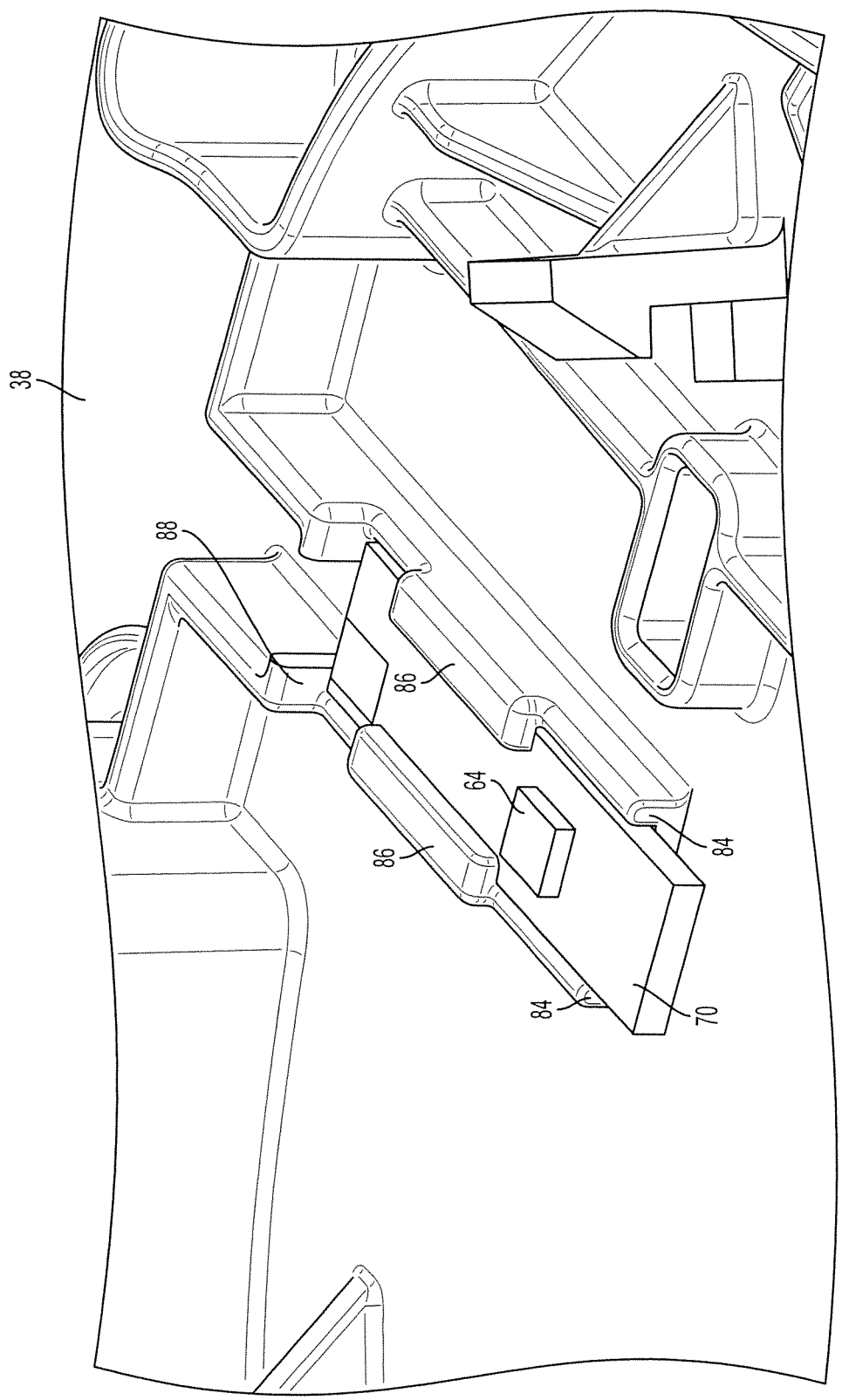
FIG. 15 shows a top view of a light base according to an alternate embodiment of the present invention.
Figure 16:
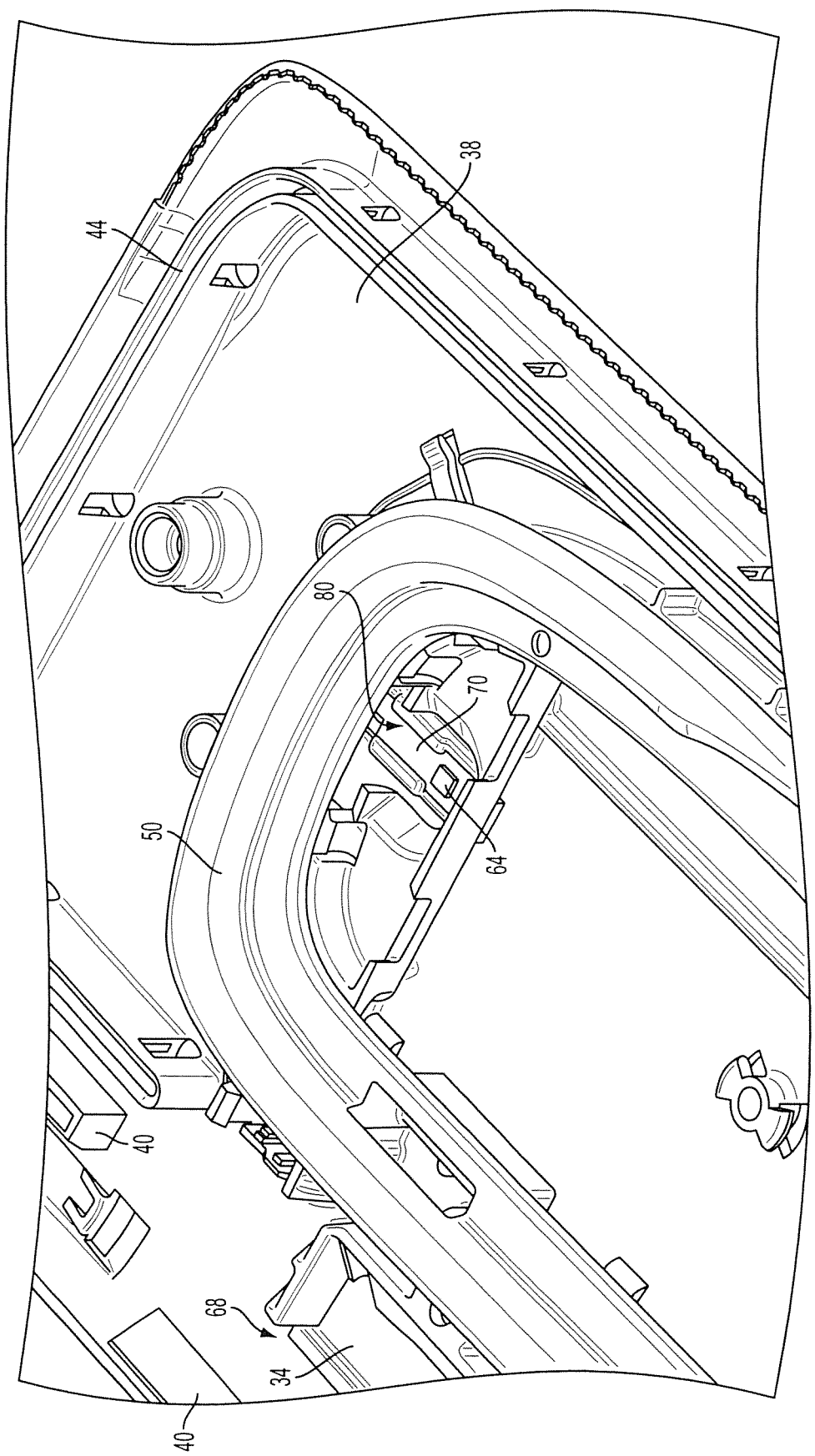
FIG. 16 shows a top view of a visor shell according to the present invention.
Figure 17:
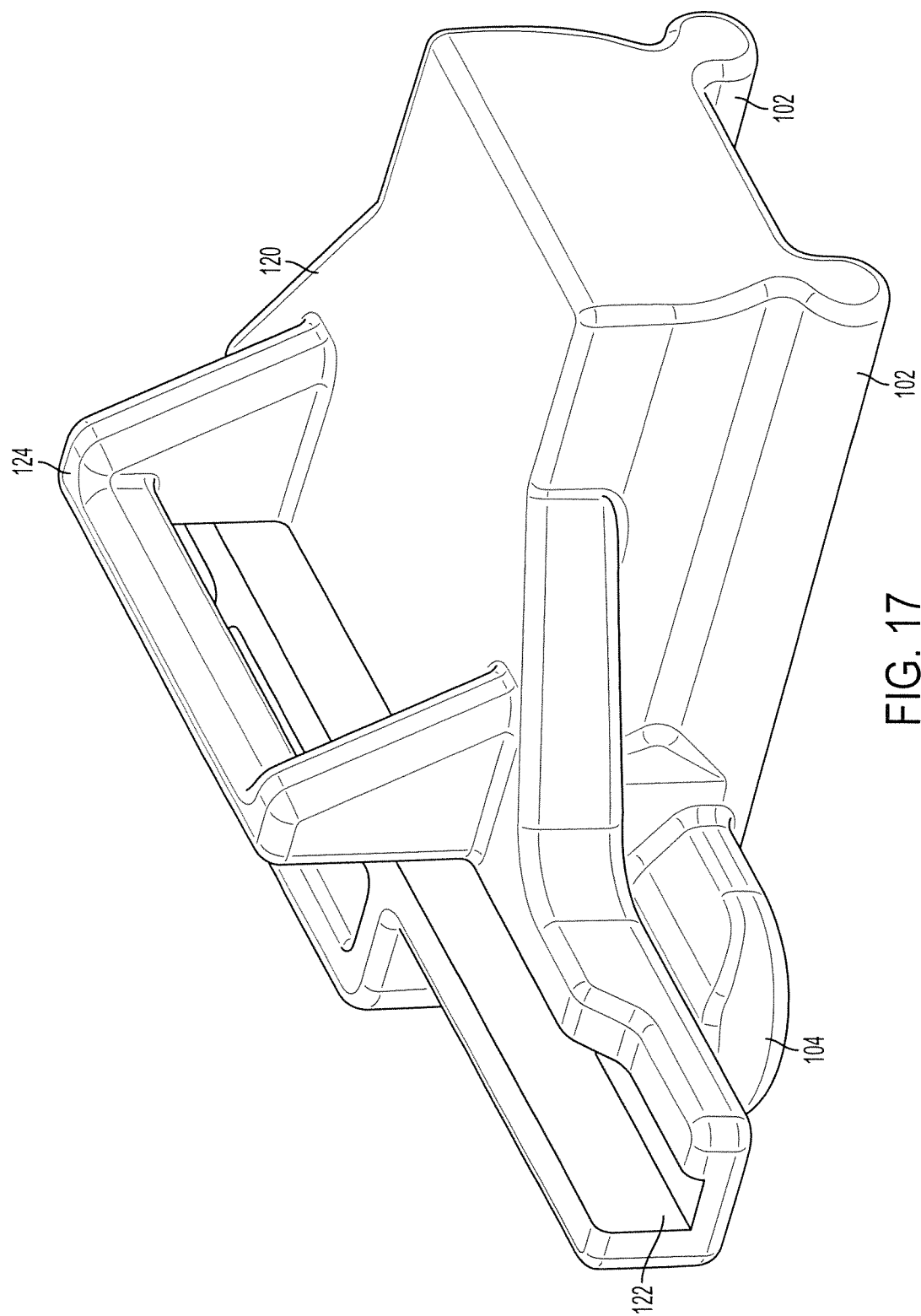
FIG. 17 shows a plan view of an alternate embodiment of a light base according to the present invention.
Figure 18:
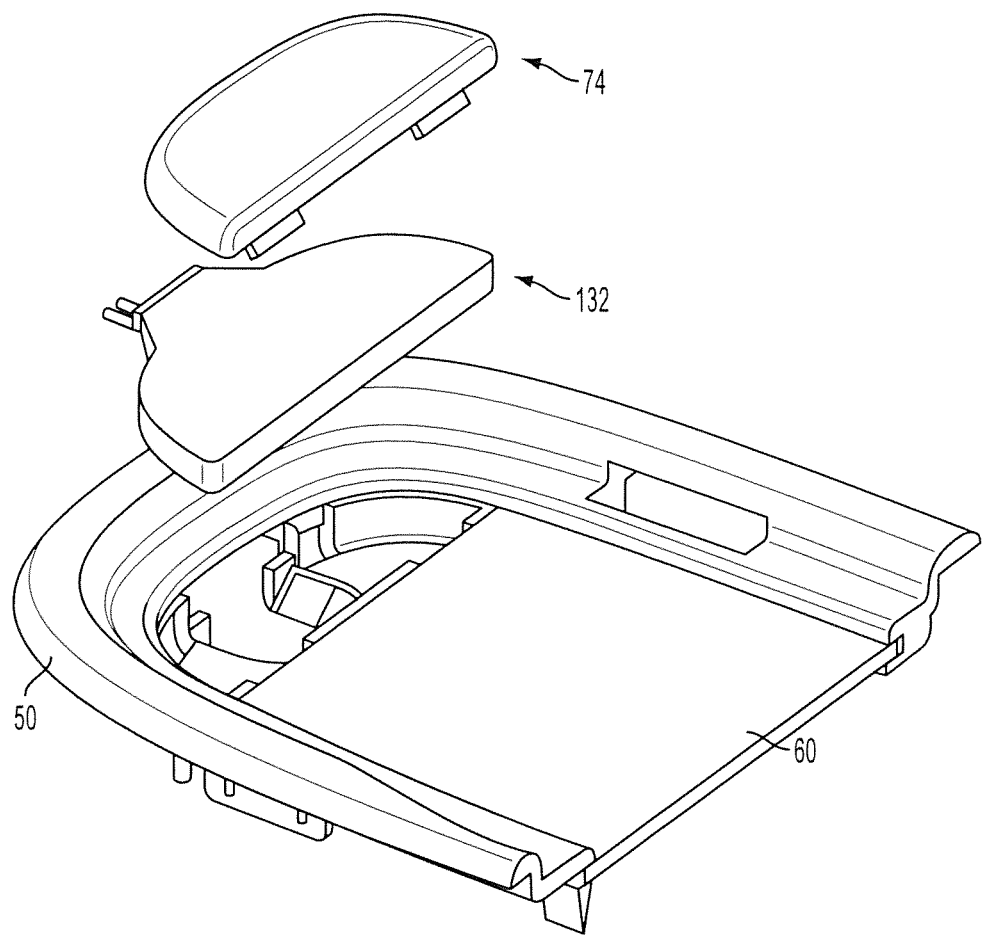
FIG. 18 shows an exploded view of a vanity according to an alternate embodiment of the present invention.
Figure 20:
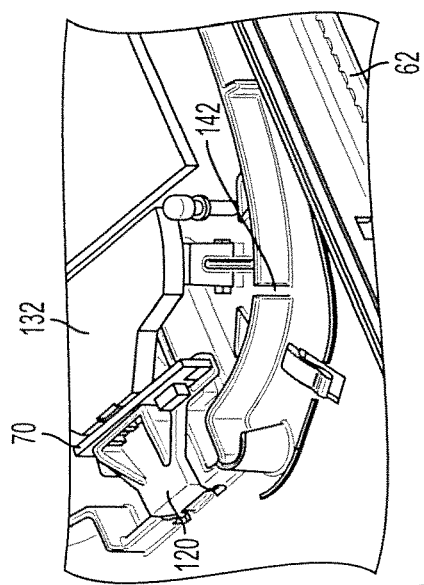
FIG. 20 shows a view of a visor according to an alternate embodiment of the present invention.
Figure 19:
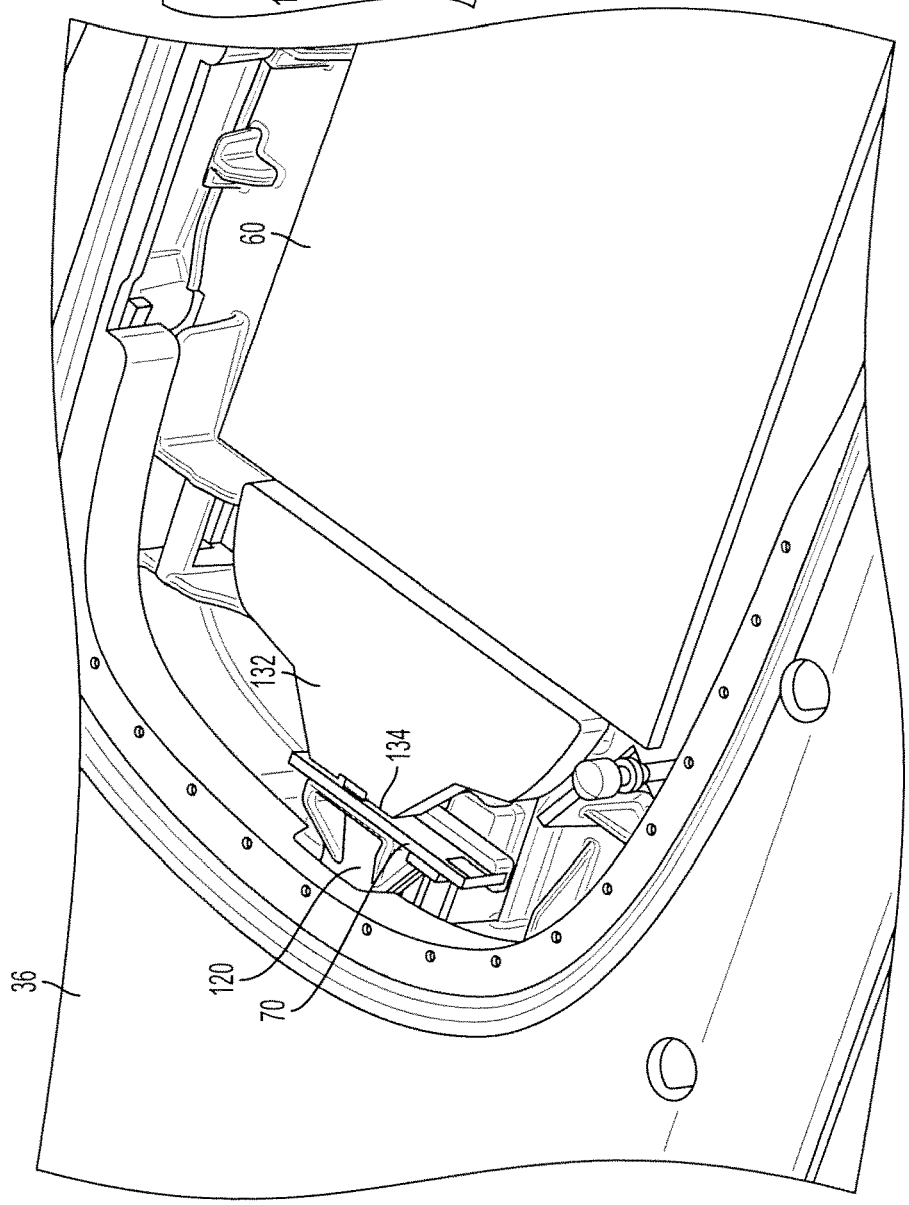
FIG. 19 shows a view of a visor according to an alternate embodiment of the present invention.
Figure 21:
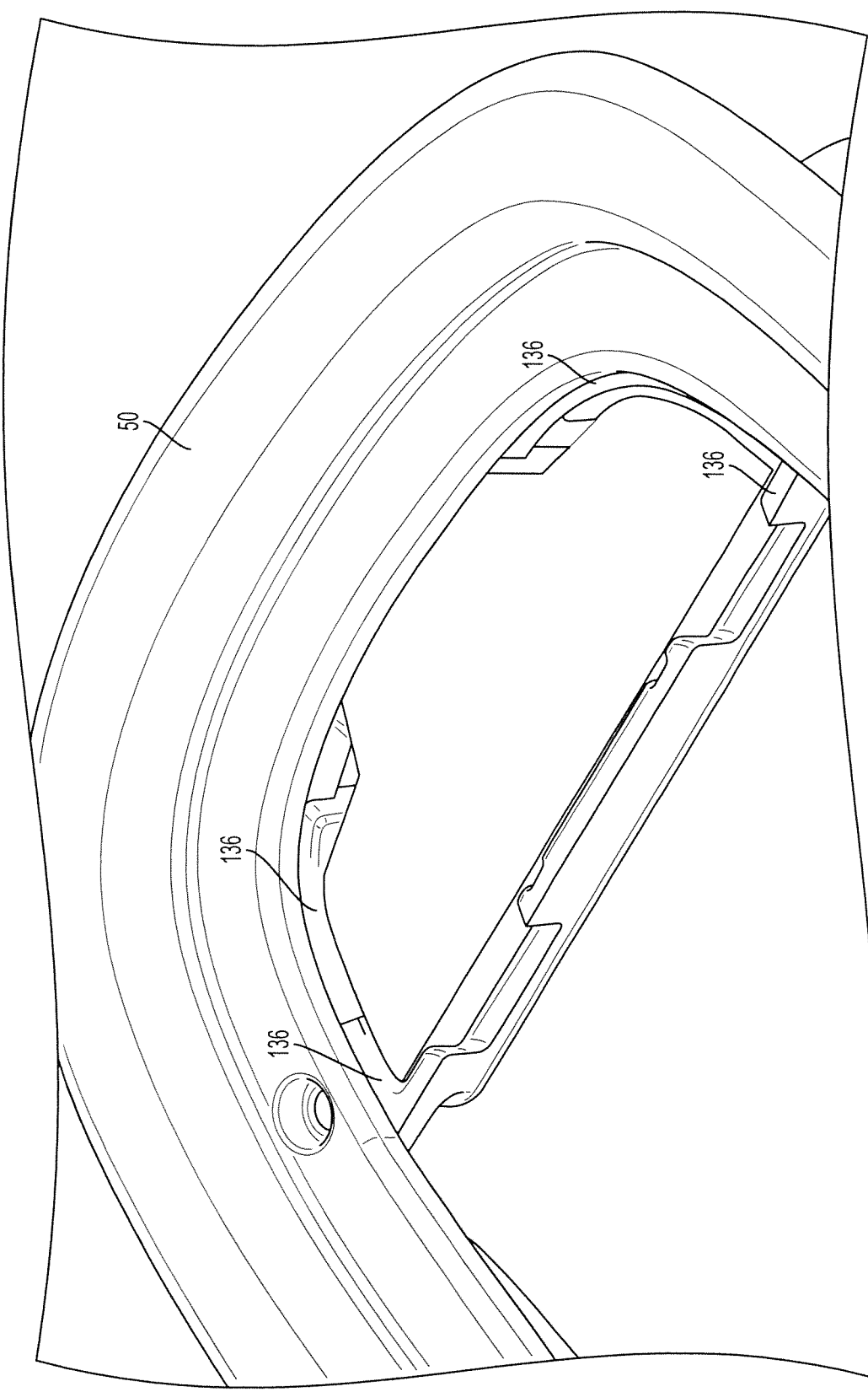
FIG. 21 shows a top view of a frame of a vanity for use in a visor according to the present invention.
Figure 26:
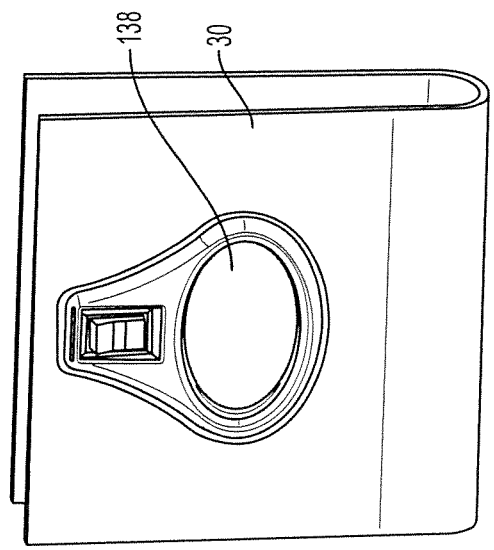
FIG. 26 shows a map light arranged in a visor according to an alternate embodiment of the present invention.
Figure 25:
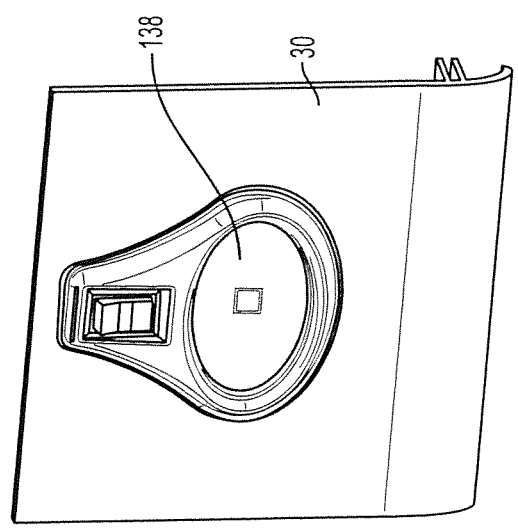
FIG. 25 shows a map light arranged in a visor according to the present invention.
Figure 27:
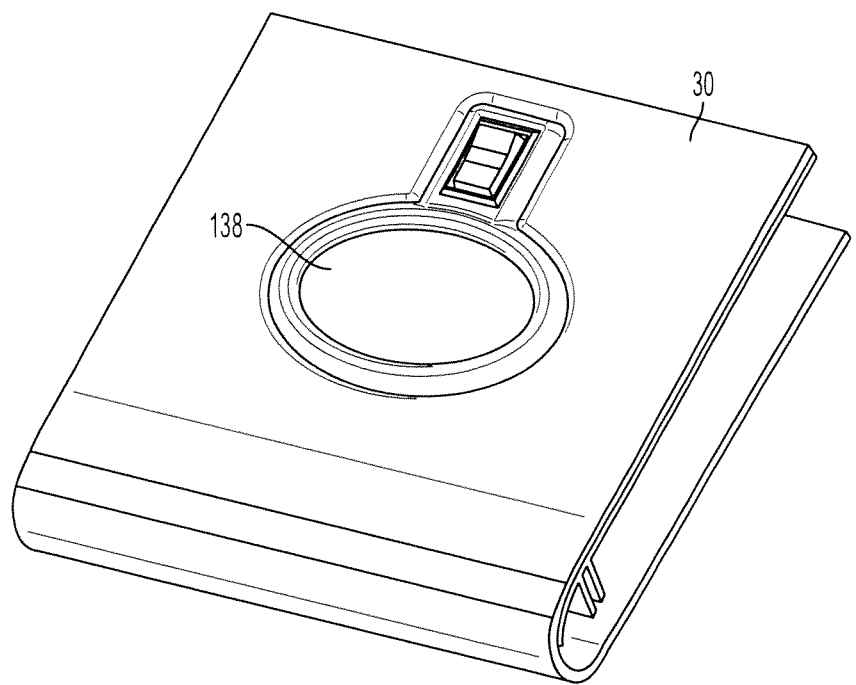
FIG. 27 shows a map light arranged in a visor according to an alternate embodiment of the present invention.
Figure 28:
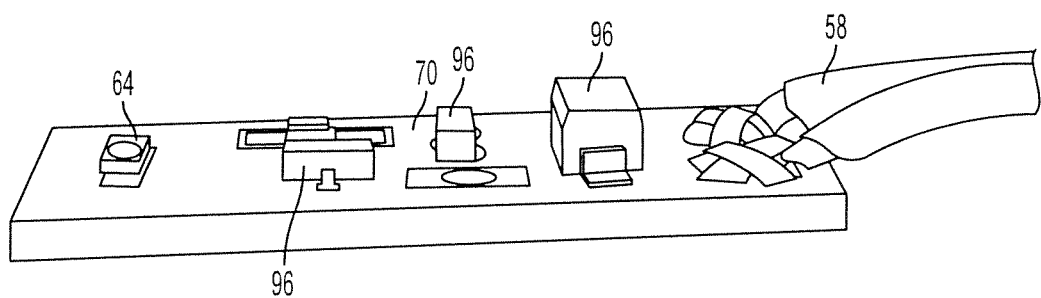
FIG. 28 shows a LED attached to a circuit board according to the present invention.

Referring to the drawings, there is shown a visor 30 according to an embodiment of the present invention. Generally, the present invention broadly provides a clam shell type vehicle sun visor 30 having a pivot rod 32 mounted to a carrier 34, wherein the pivot rod 32 and carrier 34 are slidably captured during assembly with the single step of attaching visor shell portions 36,38 together. The carrier 34 thus rides in the visor body 42 itself rather than a separate carrier and is preferably retained between surfaces and/or features, such as channels 40 molded integrally within the shell portions 36,38. Similarly, the pivot rod 32 rides in the visor body 42, and a separate bracket, bezel or similar piece is not necessary to support the pivot rod 32. Related aspects of the present invention include methods for manufacturing a sun visor 30 also described herein. Furthermore, it should be noted that the visor 30 as shown in the present application can be used in any known type of vehicle, such as but not limited to, automotive vehicles, maritime vehicles, aerospace vehicles, military vehicles and any other known vehicle that has a need for the sun to be blocked from filtering into the interior compartment of the vehicle. It should also be noted that generally all of the components of the visor 30, according to the present invention, may be made of a plastic material that is capable of either being extruded, molded or shaped by any known manufacturing process. However, any other known metal, ceramic, plastic, composite, natural material or any other known material may also be used for any of the parts or components of the visor 30 described herein. Furthermore, it should be noted that the visor 30 of the present invention may be any known type of visor, such as a sliding visor, a non-sliding visor, a moveable visor, or any other type of visor known in the vehicle industry.

In one embodiment shown in the Figures, the visor 30 includes first 36 and second shell 38 halves or shells which are engageable to form an elongate visor body 42. Various molded features 48 may be included on each shell 36,38 to facilitate engagement of the shells. For example, complementary structures may be formed on the respective visor shells 36, 38 that allow a snap-fit therebetween. In one contemplated embodiment, the shells 36,38 may be formed having integral or connected longitudinal peripheral edges 44,46 and, respectively. Other embodiments are contemplated in which shells are formed as separate, unconnected members. Although connected shells are preferred, the visor 30 has shown in the Figures may have unconnected shells also. The visor 30 further may include a pivot rod 32 that is arranged into one end of the visor body 42 and connect on the opposite end to a headliner or roof of the vehicle into which the sun visor 30 is arranged. The visor 30 is preferably formed such that the shells 36,38 may be closed about pivot rod 32 and as such capture the pivot rod 32 therebetween in a single assembly step. Also, the visor 30 may include a carrier 34 which is slidably captured by the closure or engagement of the shells 36,38, slidably securing the carrier between the shells 36,38 without the need for installation of an internal slide member, retainer or similar mechanism for mounting the pivot rod 32. All the component parts of the visor 30 may be manufactured from any known materials and by known processes, such as but not limited to, any type of plastic, metal, ceramic, composite, natural material or any other known material, and by any type of molding technique, forming technique, chemical and mechanical process to design and make the components as described herein.

Generally, the shells 36,38 are formed by injection molding a plastic material in a conventional manner. For example, the shells 36,38 may be formed from a molded polyethylene, or by some other suitable method and/or material. The first 36 and second shells 38 generally include retaining surfaces in any known shape, such as arcuate retaining surfaces, flat or angled retaining surfaces, all of which may be elongate or trough shaped surfaces extending parallel to an edge of a visor shells and defining a portion of a cylinder or wall. It should further be appreciated that the present invention may encompass designs with retaining surfaces that vary in dimension between longer, trough-shaped features and more narrow arcuate ledges as shown. It should further be noted that an arcuate pair of surfaces may be aligned near one end of the visor shells 36,38 to allow for the pivot rod 32 to be properly supported and capable of rotating and sliding with relation to the visor body 42. The visor half shells 36,38 also may have a channel formed near one edge thereof, wherein the channel may have a first and second bearing surface. These bearing surfaces may be arranged at any known angle with relation to a center line of the visor body 42. In one contemplated embodiment, these angled surfaces may be arranged on each side of a channel that extends a predetermined distance along a longitudinal axis of the visor body 42 and these angled surfaces may be any approximate angle with relation to a center line of the visor body 42. It should be noted that these angled bearing surfaces may be arranged on each inner surface thereof. It should also be noted that the visor half shells 36, 38 may include other surfaces that receive and hold various components of the sliding visor 36, such as but not limited to the pivot rod 32, a D-ring, a vanity 66, and covering material 52 arranged over the visor body 36 to complete assembly thereof.

The shell halves 36,38 that form the visor body 42 of the visor 30 according to the present invention also may include a plurality of hybrid snap and ultrasonic weld joints. In one contemplated embodiment, a plurality of profile snaps may be arranged around the front edge and the side edges of the arcuate shells of the visor shells 36,38. One of the shells may have the male portion of the profile snap while the other shell may have the female portion, which receives the male portion and holds the first shell to the second shell in order to provide robust, zero flex interface between the two half shells 36,38 to form a robust visor body 42. These snaps, which are arranged around the outer profile, may allow for enough flex for the front edge and side edges to allow for a tucking process to occur as described hereafter. The visor body 42 may also include at least one weld bar joint and at least one weld boss joint arranged at a predetermined position on the visor body 42. It should be noted that other contemplated methodologies and fasteners may be used to secure the two visor shell halves 36,38 to one another, and it is also contemplated that the visor 30 is formed as one single body member and not of two separate shell halves.

One of the shell halves also may include a predetermined shaped orifice or cavity 54 on an outer surface thereof that may be used to receive and secure a vanity 66 to the visor body 42. The orifice or cavity 54 for receiving a vanity 66 may include a plurality of locking surfaces or locking arms that may interact with locking surfaces or flanges of a frame 50 of the vanity 66 to ensure the vanity 66 is secured to the outer surface of one of the shells of the visor body 42. These locking surfaces and fingers may take any known shape and are arranged such that both illuminated and non-illuminated visor vanities may be arranged therein. Other surfaces may also be molded into the visor half shells 36,38 to allow for placement of wires 58 to illuminate a visor vanity mirror 60 or to receive a universal garage door opener or other component directly into the visor body 42. The visor half shells 36,38 according to the present invention, may also include a plurality of teeth 62 arranged around an outer periphery of the front edge and side edges of each of the shell halves 36,38. These teeth 62 generally have a pyramidal or triangular like shape tooth and may either be directly aligned with one another from each half shell or offset with one another from each half shell, depending on the design requirements and the tucking process to be used. This use of the teeth 62 to form a tuck edge and to have the cover material 52 placed by a tuck edge process into engagement with the teeth may create an aesthetically pleasing visor body 42 having a crisp and clean outer cover material 52 arranged thereover. It should be noted that in one contemplated embodiment the cover material 52 may be formed in the shape of a sock, wherein the sock is arranged over one end of the visor body 42 then the tuck process is used to create the clean front edge and side edges of the visor 30. However, any other known tuck process and cover material 52 that is not in the form of a sock may also be used depending on the design requirements and the visor 30 being created.

The visor 30, according to the present invention, may also include a D-ring secured to the visor body 42 on a top edge thereof. The D-ring may be any known D-ring. The D-ring of the present invention may partially assist in holding the cover material 52 in a taught, clean manner over the outer surface of the visor half shells 36,38 formed into a visor body 42. It should be noted that any shape may be used for the D-ring body and D-ring pin associated therewith. The visor 30 may include a pivot rod 32 which is attached at one end to a bracket or connector which is secured to the headliner or roof of a vehicle. The bracket may have a connector secured thereto to connect the electrical system of the vehicle via a wire 58 to the bracket, the wire 58 is then passed through the pivot rod 32, which generally is hollow according to the present invention. However, it should be noted that a solid pivot rod 32 may be used, as long as it will be capable of passing electricity therethrough to allow for illumination of the vanity mirror 60 if necessary or map light 64. The bracket may be secured to the roof of the vehicle via fasteners or any other known methodology. The bracket may include an orifice that will receive one end of the pivot rod 32 near an elbow of the pivot rod 32, wherein the pivot rod 32 generally has an angle of 60°-120° at the elbow. The pivot rod 32 may be secured and capable of rotation within the orifice of the bracket and may also be swung between a front windshield of the vehicle and a side window of the vehicle to block the sun from any angle. The pivot rod 32 may be of any known length and diameter depending on the design of the visor 30 and the automobile into which it is arranged. The wire 58 may be connected from the electrical system of the automobile and is passed through to a LED 64 for illumination of a visor mirror 60 in the vanity 66. It should be noted that the visor 30, pivot rod 32 and bracket may be made of any known material, such as but not limited to plastic, ceramic, composites, metals, or natural material, etc.

The visor pivot rod 32 is arranged within a carrier 34 that is arranged within the visor body 42. The carrier 34 is capable of slidable movement if the visor 36 is a sliding visor. If the visor 30 is not a sliding visor, the carrier 34 is fixed with respect to the visor body 42. In the sliding visor the carrier 34 may slide within a channel 68 of the visor body 42 to allow for the visor 30 to be extended out towards an end of the visor rod 32 secured within the visor body 42. Any known carrier 34 may be used to secure the pivot rod 32 to the visor body 42, such as but not limited to a floating carrier, a fixed carrier or any other known carrier associated with a visor 32 rod and visor body 42.

The visor 30 may also include a wire routing system that passes a wire 58 from the bracket through the pivot rod 32 to the LED 64 vanity light for illumination of a vanity mirror 60 therein. Any known wire routing system may be used to pass the wire 58 through the visor body 42 to a circuit board 70 used to control and operate an LED 64 thereon. It should further be noted that it is also contemplated to use an onboard electric source to illuminate the LED 64 of the vanity 66 for the visor 30.

The visor 30 also may include a vanity 66. The vanity 66 generally includes a vanity door 72, door springs, a vanity spring, and a vanity mirror 60, with optional lights arranged thereon. If the vanity 66 is illuminated, the vanity 66 may also include at least one lens 74 to disperse light in a predetermined manner. In another contemplated embodiment, the vanity frame 50 may include two lens 74, one arranged on each side of the vanity 66 to illuminate the mirror 60. The vanity frame 50 generally may include at least one, but in the embodiment shown, two connecting flanges arranged near or at a bottom surface of the vanity frame 50. The opposite end of the vanity frame 50 may have arranged therein at least one locking shoulder or surface that may interact with locking tabs arranged on a surface of one of the visor shell halves 36,38. This may allow for the vanity frame 50 and vanity 66 to be secured to the visor body 42 without fasteners, such as screws, etc. However, it should be noted that another embodiment may use fasteners and screws to connect the vanity frame 50 to the visor body 42. One contemplated embodiment may create a snap in vanity 66. Generally, the vanity frame 50 and door 72 may have a rectangular or oval shape, however any other shaped vanity 66 may be used depending on the design requirements of the visor 30. The vanity 66 and frame 50 may also include a flex hook arranged at one end thereof and a leaf spring arranged on an opposite edge of the orifice defined in the middle of the vanity frame 50. Adjacent to the leaf spring may be one or two locking tabs. This combination of the flex hook, leaf spring and locking tabs along with lens tabs that are used to secure the lens 74 to the vanity frame 50, may be used to secure a mirror 60 into a flexible interface without adhesives. In operation, the mirror 60 is placed under the flex hook and then snapped under the locking tabs and against the leaf spring to secure the mirror 60 without adhesives to the vanity frame 50. However, it is also contemplated to secure the mirror 60 to the vanity frame 50 with adhesives or any other methodology. The lens tabs, generally which are arranged on either side of the vanity frame 50 may keep the vanity mirror 60 positioned properly in a side to side direction with relation to the vanity frame 50. Hence, the vanity mirror 60, which may be of any shape, size or thickness, may be held in place to the vanity frame 50 without adhesives, which are generally used to hold a vanity mirror 60 to a frame 50 in the prior art. It should be noted that any number of leaf springs, locking tabs and flex hooks may be used to hold the vanity mirror 60 according to the present invention. The vanity frame 50 may be inserted into the visor body 42 by securing a first and second flange arranged near one end of the vanity frame 50 underneath inboard hooks that are molded into an outer surface of one of the core visor body half shells 36,38. These flanges may be arranged under these inboard hooks and then the opposite end of the vanity frame 50 may be snapped into place with a downward force, such that the locking shoulders or surfaces of the vanity frame 50 may interact with the locking tabs or snaps molded onto and into the visor half shell 36,38 in an outer surface thereof. This may secure the vanity 66 into the visor body 42 with a snap in system that does not require fasteners, such as screws, to secure the vanity system to the visor body 42. It should be noted that the vanity 66 of the present invention may include fasteners and screws to secure it to the visor body 42.

It should be noted that the visor half shell 36,38 that holds and supports the vanity 66 also may include a light base 80 secured thereto. In one contemplated embodiment the light base 80 is molded into one of the shells 36,38, such as the second shell 38 of the visor body 42. The light base 80 may include a pocket 82 therein which secures a circuit board 70 therein to hold the circuit board 70 in a predetermined fixed position with respect to the second shell 38 and the vanity 66. The pocket 82 may be formed or molded into a predetermined inside surface of the second shell 38. The light base 80 in this embodiment has the pocket 82 which in part is defined by a first and second guide member 84, wherein the first and second guide member 84 extends from an inside surface of the second shell 38 and are parallel to each other. Each of the first and second guide members 84 may have an inward extending flange 86 extending from a top end thereof. The flanges 86 may engage with a top surface of the circuit board 70 to assist in securing the circuit board 70 with relation to the vanity 66. The first and second guide members 84 generally may have any known predetermined shape, but may have a generally L shape when viewed from the front. The L shape may define a seat on each of the guide members 84 onto which the circuit board 70 may rest or be seated. The seat portion of the guide member 84 and the bottom surface of the inward extending flange 86 of the light base 80 may have a predetermined distance therebetween. This predetermined distance generally may be equal to or greater than the thickness of the circuit board 70 that is arranged therein. The light base 80 also may include a stop wall 88 arranged at a back end thereof. The stop wall 88 may extend in a predetermined direction away from the inside surface of the second shell 38 of the visor body 42. During operation, the circuit board 70 may be slid within the front side of the pocket 82 of the light base 80 until one end of the circuit board 70 engages the stop wall 88 of the light base 80. The light base 80 may also include a locking arm 90 arranged generally at a mid line of the pocket 82. The locking arm 90 may engage with a predetermined portion of the circuit board 70 and secure the circuit board 70 within the light base 80. The locking arm 90 generally may have a rectangular shape with a locking shoulder 92 arranged on the end thereof. One end of the locking arm 90 may be molded directly into a surface of one of the half shells 36,38 of the visor body 42. The other end may be moveable or flexible thus allowing for the locking arm 90 to pivot about the first end which is fixed and molded into the visor body half shell. This may allow for movement of the locking shoulder 92 and the locking arm 90 in order to engage with a predetermined portion of the circuit board 70. The locking arm 90 may have a predetermined spring co-efficient which may allow for the locking arm 90 to securely hold the circuit board 70 at a predetermined position with relation to the vanity 66.

The light base 80 may also include a gap or recess 94 formed between two predetermined surfaces to form a wire routing channel for the circuit board 70. The wire 58 may connect to one end of the circuit board 70 and on the other end to the electronic system of the vehicle, wherein the wire 58 may run through a predetermined area of the visor body 42 and through the pivot rod 32 into the electrical system of the vehicle. The circuit board 70 generally may have a rectangular shape, with a predetermined length, width and thickness. It should be noted that the circuit board 70 may be of any known shape, but in the embodiment shown is a rectangular shape. Arranged on a top surface of the circuit board 70 is an LED 64. It should be noted that the LED 64 may be of any type, color and any known shape. The LED 64 as shown in the drawings is generally a square LED 64. Electrical components 96 may be arranged on the circuit board 70 and form the necessary circuitry for illuminating the LED 64 and passing such illuminated light 70 to a lens 74 and mirror 60 of the vanity 66. The electronic components 96 may be, but are not limited to, diodes, resistors, capacitors, integrated circuits or any other known electrical component necessary to operate an LED 64. It should be noted that the LED 64 in the embodiment shown is secured within the light base 80, such that the circuit board 70 is parallel to an inside surface of the visor body 42. This in effect holds the circuit board 70 in a horizontal position with relation to the visor body 42. The use of this embodiment of the light base 80 may provide for a direct bulb replacement version of the LED lighted visor. This may allow for the circuit board 70 and LED 64 to be positioned in generally the same place or area as the prior art bulb and socket which was used in prior art visor designs. Generally, no changes to the vanity sub assembly are required other than the molding of the light base 80 therein. It should be noted that the circuit board 70 generally has the plurality of electronic components 96 arranged on a bottom surface thereof and on the opposite side of the LED 64, which may be arranged on a top surface of the circuit board 70. The circuit board 70 may also include a locking member 98 extending from the bottom surface, wherein the locking member 98 may interact and inter-engage with the locking shoulder 92 of the locking arm 90 of the visor body 42. It should be noted that the light base 80 and circuit board 70 may be arranged on each side of a vanity 66. However, it is also contemplated to have a LED 64 arranged on only one side of the vanity 66 and it is even contemplated to use a LED 64 on only one side of the vanity 66 and pass the light from that one LED 64 via a light guide to both ends or sides of the mirror 60 of the vanity 66.

Another embodiment of the visor 30 may include a light base 100 that is a separate component that is molded or formed separate from the visor body half shells 36,38. In this embodiment, the light base 100 generally has a rectangular shaped body that includes a first and second rail parallel 102 to one another on a bottom surface thereof. The rails 102 generally have a circular shape and extend from the bottom corner edge on each side thereof. The parallel rails 102 may have a predetermined diameter, which may mate and inter-engage with a predetermined channel molded onto one of the shells 36,38 of the visor 30. The light base 100 may also include a first and second arm 104 with one of the arms extending from each side thereof near a mid portion of the light base 100. The arms 104 generally may have any known shape, such as but not limited to a semi-circular or semi-silo shape when viewed from above. The arm 104 may extend a predetermined distance from the side of the light base 100. The arms 104 may have an angled surface on a top side thereof. The light base 100 may also include a locking tab 106 extending from a bottom surface thereof, wherein the locking tab 106 interacts and engages with a locking slot 108 arranged and molded within the shell 38. The locking tab 106 generally may extend between the first and second parallel guide rails 102 and from the bottom surface of the light base 100 such that the tab 106 generally has an arcuate shape extending from a bottom surface of the light base 100, wherein the locking tab 106 extends a predetermined distance beyond a surface of the guide rails 102. In one embodiment, the locking tab 106 is generally aligned along a mid point of the first and second arms 104, which extend from a side of the light base 100. Arranged on one end of the light base 100 is a slot 110. The slot 110 is formed, such that the circuit board 70 is placed within the slot 110 and secured in a predetermined position with respect to the second shell 38. The slot 110 is in part defined by a first and second leg 112 that extend from the light base 100. The first and second leg 112 may each have a groove that has a generally square shape arranged at a mid point thereof. Each of the grooves arranged in the first and second leg 112 may be used to hold one edge of the circuit board 70 arranged therein. A predetermined distance is arranged between the first and second grooves, such that the predetermined distance is generally equal to the width of the circuit board 70. This may allow for the circuit board 70 to be slid within the slot 110 arranged on the front end of the light base 100 and securing the circuit board 70 to the light base 100 via a locking snap member 114 arranged on a surface of the light base 100. The locking snap member 114 generally may be arranged near or on a surface near a mid point of the light base 100. Each of the arms 112 of the light base 100 may have a reinforcing rib 116 extending from a bottom surface of the arm 112 to a surface of the light base 100. The reinforcing ribs 116 generally may have a triangular shape when viewed from a side. The snap lock member 114 may be arranged between the ribs 116 adjacent to a predetermined shaped cavity arranged within an end of the light base 100. The predetermined cavity generally may have any known shape, but generally has a rectangular or square shape in the current embodiment. This may allow for the lock member 98 extending from a bottom surface of the circuit board 70 to inter-engage with the snap lock member 114 and hold the circuit board 70 in place within the light base 100 of the present invention. The snap lock member 114 may have any known shape and in one embodiment it generally has a triangular shape and extends a predetermined distance from an end of the light base 100 and a predetermined distance into the cavity that holds the lock member 98 of the circuit board 70. This may allow for the interaction and engagement of the snap lock member 114 with the lock member of the circuit board 70. It should be noted that the snap lock member 115 is only one contemplated embodiment to secure the circuit board 70 within the light base 100 and that any other known locking feature may be used to secure the circuit board 70 therein. The light base 100 of this embodiment may interact with a plurality of features that are molded into an inner surface of one of the half shells 36,35 of the visor body 42. The second shell 38 may have a first, a second, a third and a fourth locking surface 118 molded therein. The locking surfaces 118 generally are defined as slightly angled surfaces molded within one of the visor half shells 36,38. The surfaces 118 may be across from one another and hence, form a predetermined sized gap. This predetermined sized gap may generally be the same or slightly greater than the thickness of one of the arms 104 of the light base 100. This may allow for the light base 100 to be slid through these gaps, such that the arms 104 interact with the first and second locking surfaces 118, wherein the first locking surface 118 may create a force that may push the first locking surface 118 down onto the arm 104 of the light base 100, while the second locking surface 118 may in effect push with an upward force onto the arm 104 of the locking surface 118, which in effect may wedge the light base 100 into the half shell 38 via the arm 104 extending from each side thereof. Therefore, the first and second locking surfaces 118 may be arranged on each side of the light base 100 and formed within the visor half shell 38. The visor half shell 38 may also have molded therein a third and fourth locking surface 118. The third and fourth locking surface 118 generally may be defined by edges or surfaces extending from predetermined flanges molded within the visor half shell 38. The third locking surface may inter-engage with one of the guide rails 102, while the fourth locking surface 118 may inter-engage with the other of the guide rails 102 of the light base 100. Therefore, the third and fourth locking surfaces 118 may be arranged near one another such that the gap therebetween may generally be the same or greater than the diameter of one of the guide rails 102. It should also be noted that the third and fourth locking surfaces 118 may be angled with relation to the guide rails 102, such that each of the guide rails 102 may be wedged between the third and fourth locking surfaces 118 that are molded into one of the visor half shells 38. It should be noted that generally all of the locking surfaces 118 or features described herein are formed by flanges or channels molded directly into the visor half shell 38. In operation, the light base 100 described in this embodiment may be slid and locked into place within the visor half shell 38. The locking tab 106 may inter-engage with a locking slot 108 that is formed and molded into a surface of the second shell 38 generally at a mid point of the light base 100. This may allow for the light base 100 to inter-engage with the visor half shell 38 at four points and be locked via one point, thus securing the light base 100 in a predetermined position with relation to the visor half shell 38 and vanity 66. After inserting and securing the light base 100 into the visor half shell 38, a wire 58 may be connected between a surface of the circuit board 70 and the electrical system of the vehicle. This may allow for a direct replacement of the light bulb system of the prior art visors.

Still another embodiment of the light base 120 may generally have the same body, guide rails 102 and arms 104 as the light base 100 described above. This embodiment of the light base 120 may further include a first slot 122 arranged along a transverse portion of a top surface of the light base 120. The slot 122 may extend across the entire width of the light base 120. The slot 122 may be used to secure and hold one longitudinal edge of the circuit board 70. Directly adjacent to the slot 122 on the top surface of the light guide 120 may be a locking member 124 extending from a top surface thereof. The locking member 124 may be directly adjacent to the slot 122 and have a generally U-shape when viewed from a front thereof. The locking member 124 may have a first and second leg 126 extending from a top surface of the light base 120 and a cross member 128 extending between the two legs 126. Generally, the front of the locking member 124 may share the same plane as one of the inward extending surface walls of the slot 122. Each of the legs 126 generally may have a triangular shape when viewed from a side, however any other shape may also be used. The locking member 124 may be of such construction that there may generally be formed a rectangular orifice through a center of the locking member 124. An electrical component or other locking member extending from a surface of the circuit board 70 may be used to interact with at least one surface of the locking member 124 of the light base 120. This may secure and hold the circuit board 70 in a predetermined position with respect to the light base 120. A wire 38 may be connected to the circuit board 70 on either side or end of the circuit board 70. The top side of the circuit board 70 may have a LED 64 secured thereto and in electrical communication with the electronics of the circuit board 70 and the electrical system of the vehicle. The light base 120 may also include a pocket 130 arranged adjacent to the slot 122 on the side opposite that of the locking member 124. The pocket 130 may extend a predetermined distance into the light base 120. The pocket 130 generally has a rectangular shape when viewed from above. The slot 122 of the alternate embodiment of the light base 120 generally may hold the circuit board 70 in a vertical position with respect to the visor body half shell 38. This may allow for the LED 64 to be held in place in the visor 30 in a vertical manner, thus allowing for the use of a light guide 132 in conjunction with the vanity 66.

The light guide 132 may generally be of any known shape, but in the embodiment shown it has generally a modified pyramidal shape with a generally circular bottom portion and a parallelogram type top portion. It should be noted that any known shape may be used for the light guide 132 of the present invention. One end of the light guide 132 having the smaller dimension generally may have a notch or cut out 134 arranged therein. The cut out 134 may be used to align with the LED 64 arranged on the circuit board 70 of the present invention. The light guide 132 having any known shape may be used in any known visor 30. The notch or cut out 134 is arranged on one edge of the light guide 132 and may have any known shape, but is generally a square type cut out shape that may mimic the square shape of the LED 64 used herein. The LED 64 may shine its light directly in a head on manner into the edge or end of the light guide 132, thus allowing for dispersion of the light evenly throughout the entire light guide 132. The use of the light guide 132 may provide for a warmer and more even appearance of the light through the lens 74 of the vanity 66. The distribution of the light via the light guide 132 may ensure no hot spot when compared to that from a regular light bulb. It should be noted that the LED 64 may touch or engage the light guide 132 but it does not have to and that the vanity 66 may have one or more lights arranged therein. It is also contemplated to use a light guide 132 that extends from both sides of the vanity 66, such that a light may be emitted via one LED 64 onto both sides of a mirror 60 within a vanity 66. However, it is also contemplated to use two separate light guides 132, one arranged on each end of the vanity 66, along with a light base 120 arranged on each end thereof to form the illuminating light for the visor 30 according to the present invention. It should be noted that the light guide 132 has a predetermined thickness and is made of any known predetermined material that is capable of producing the distribution of the light as required by the present invention. It should be known that any known or unknown material may be used for the light guide and light guide systems arranged herein. It should further be noted that the LED or LED's 64 may be directly affixed or attached to the light guide 132 at a predetermined position thereon, such as but not limited to, at the notch 134, etc. The necessary electronics to operate the LED 64 directly attached to the light guide 132 may be arranged between the LED 64 and a power source for the visor or vehicle. Generally, the light guide 132 of the present invention may be arranged within the visor vanity frame 50 with a lens 74 arranged over a top surface thereof to protect the light guide surface. The lens 74 may be of any known type or design. In one contemplated embodiment the notch 134 of the light guide 132 may be approximately four millimeters wide, however any other shape, width or notch may be used for the input light area for the light guide 132. The vanity frame 50 of the present invention may include a predetermined shaped orifice therein that generally mimics the outer shape of the light guide 132. The light guide 132 may then be held within the vanity frame 50 through a press fit by using crush ribs 136 at strategic locations, such as on each corner end of the light guide 132. However, it should be noted that it is also contemplated to have the light guide 132 slid into position or held in place via snaps or a staking operation to ensure that the light guide 132 remains fixed with respect to the vanity frame 50 and light base 120 which holds and secures the LED 64 in relation to the light guide 132. Therefore, any of the known methodologies of holding such as a press fit, snap or staking may be used to hold the light guide 132 in position on one or both ends of the vanity frame 50, then the vanity frame 50 may have a lens 74 arranged over a top of the light guide adjacent to the mirror 60 to provide illumination, for the user, of the mirror 60 via the LED light 64 and light guide 132. It should also be noted that predetermined openings or pass-through 142 in ribs and other components of the visor half shell 38 may be arranged therethrough in order to pass the wire 58 from the electrical system of the vehicle to the circuit board 70 of the light base 120, wherein the circuit board 70 is being held in a vertical position.

It is also contemplated in the LED visor vanity of the present invention that instead of using a lens 74 over either a light guide 132 or a direct replacement LED 64, that either may be covered by extending the mirror 60 to the ends of the visor vanity frame 50 and eliminating any of the adhesive on the bottom of the mirror 60. This may allow for the light to shine directly through the mirror 60 and remove the need for the use of a lens 74 to disperse the LED light in a predetermined manner. Furthermore, it is also contemplated that a grid 140 may be molded into the vanity frame 50 in order to protect the light guide 132 or LED 64 and disperse the light from the light guide 132 or LED 64 in a predetermined manner. It is contemplated that these grids 140 may be of any known shape, such as a honey comb design, or arc lines with a support arm design as shown in the drawings. Any of these molded grids 140 or the extending of the mirror 60 while eliminating the tape on the bottom of the mirror may be used in conjunction with the LED system of the present invention. It should be noted that it is also contemplated that a map light 138 that may be arranged in the first or second shell 36,38 of the visor body 42 may use a light emitting diode 64 and a light base 80 associated therewith according to the present invention to provide a map light 138 for use by the user of the vehicle, wherein the map light 138 may be a separate lighting system from that of the vanity mirror lighting system described herein.

Figure 29:
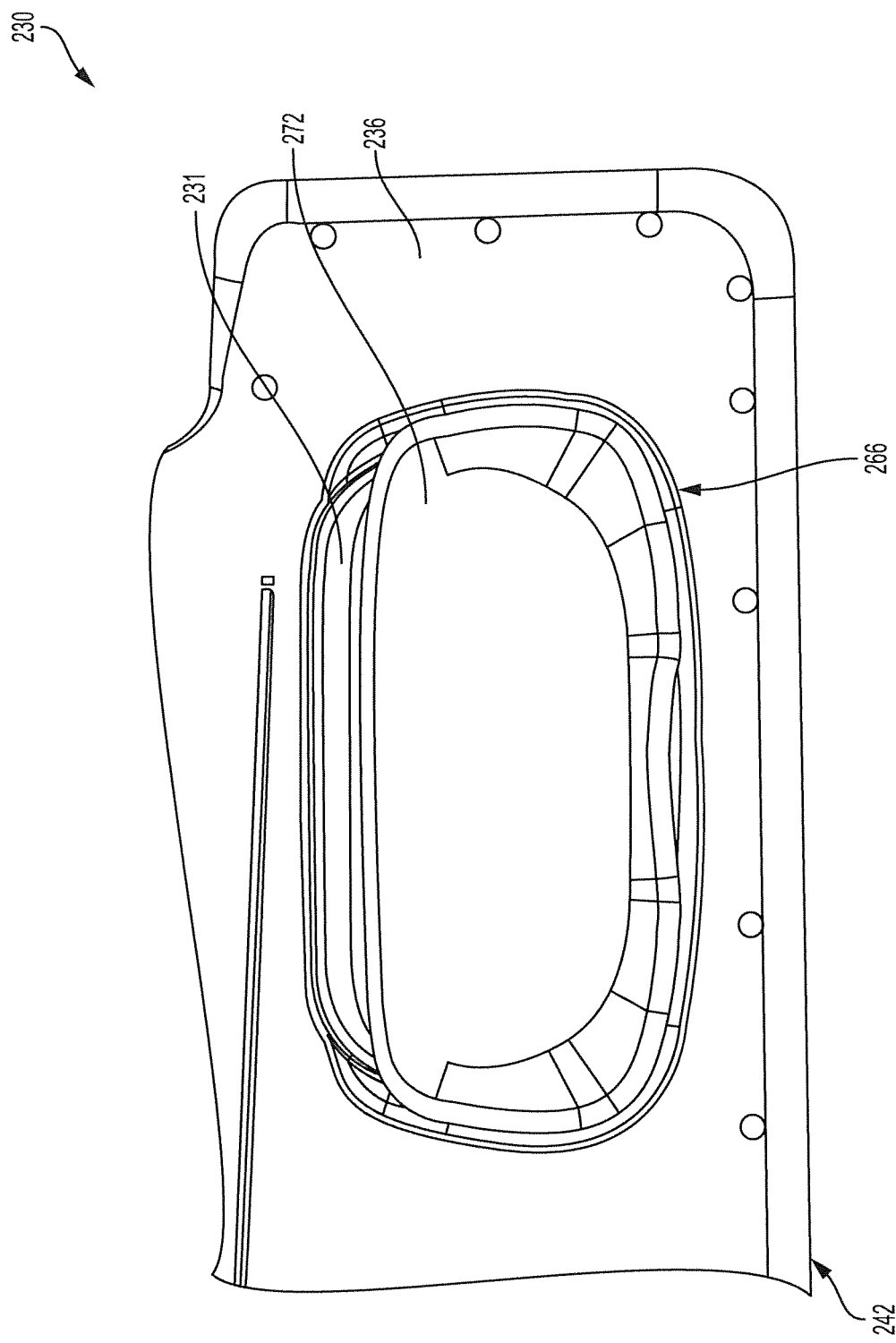
FIG. 29 shows a plan view of a visor according to an alternate embodiment of the present invention.
Figure 30:
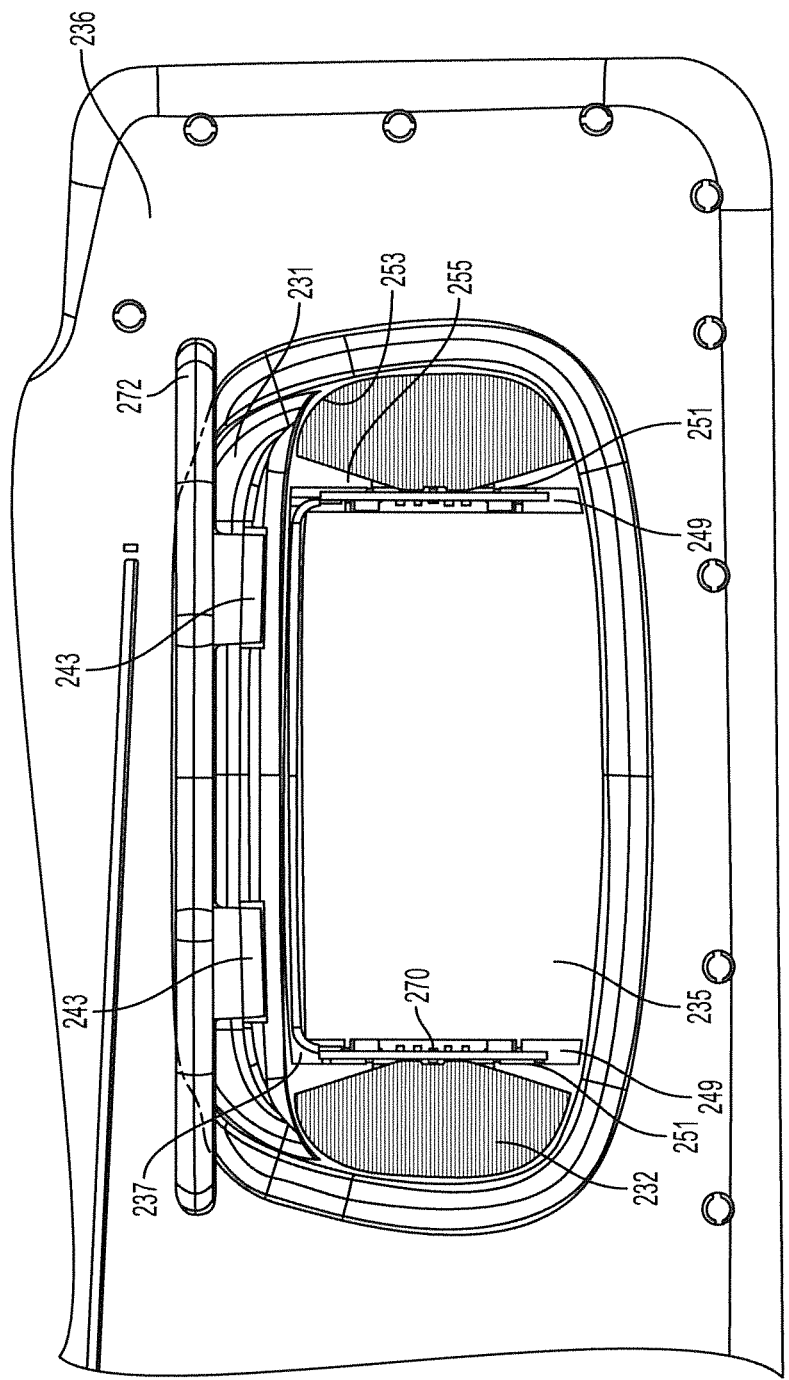
FIG. 30 shows a top view of a visor according to an alternate embodiment of the present invention.
Figure 31:
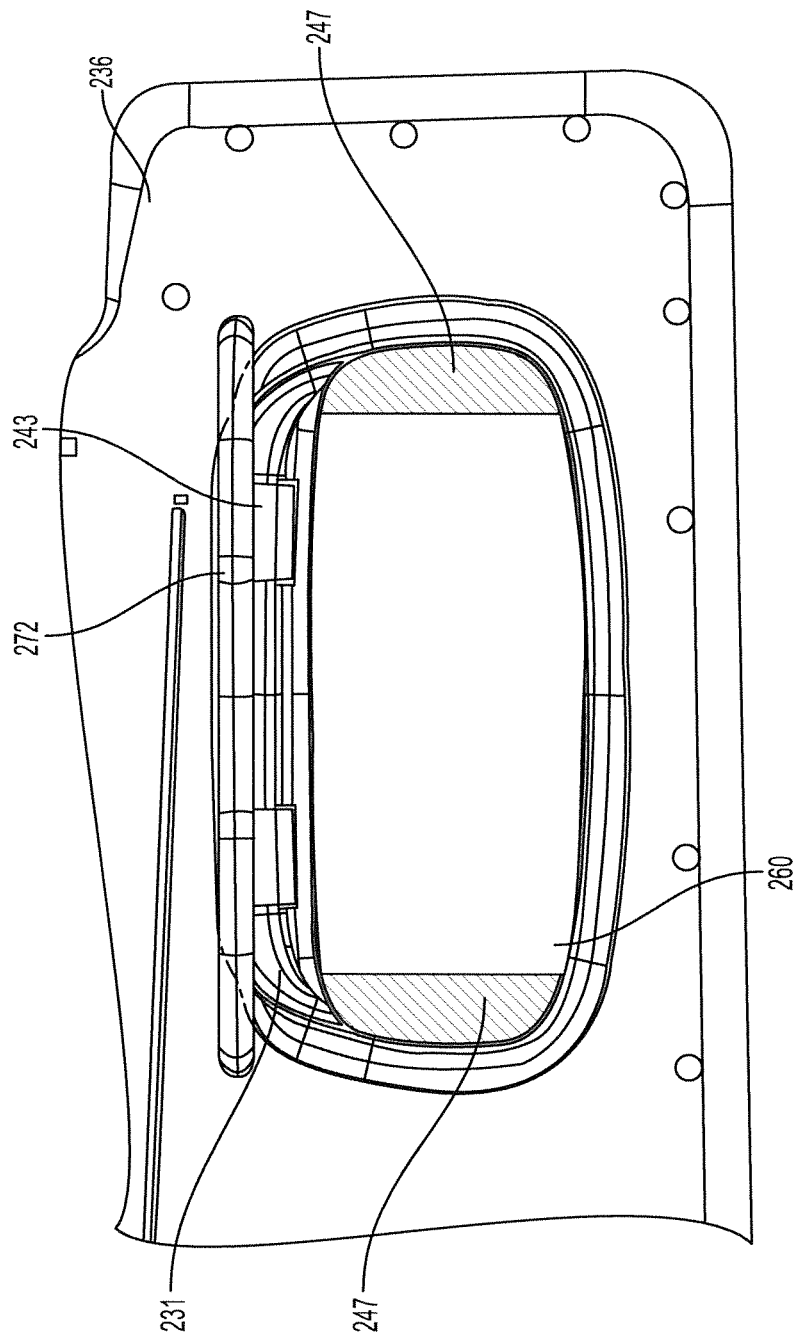
FIG. 31 shows a top view of a visor according to an alternate embodiment of the present invention.
Figure 32:
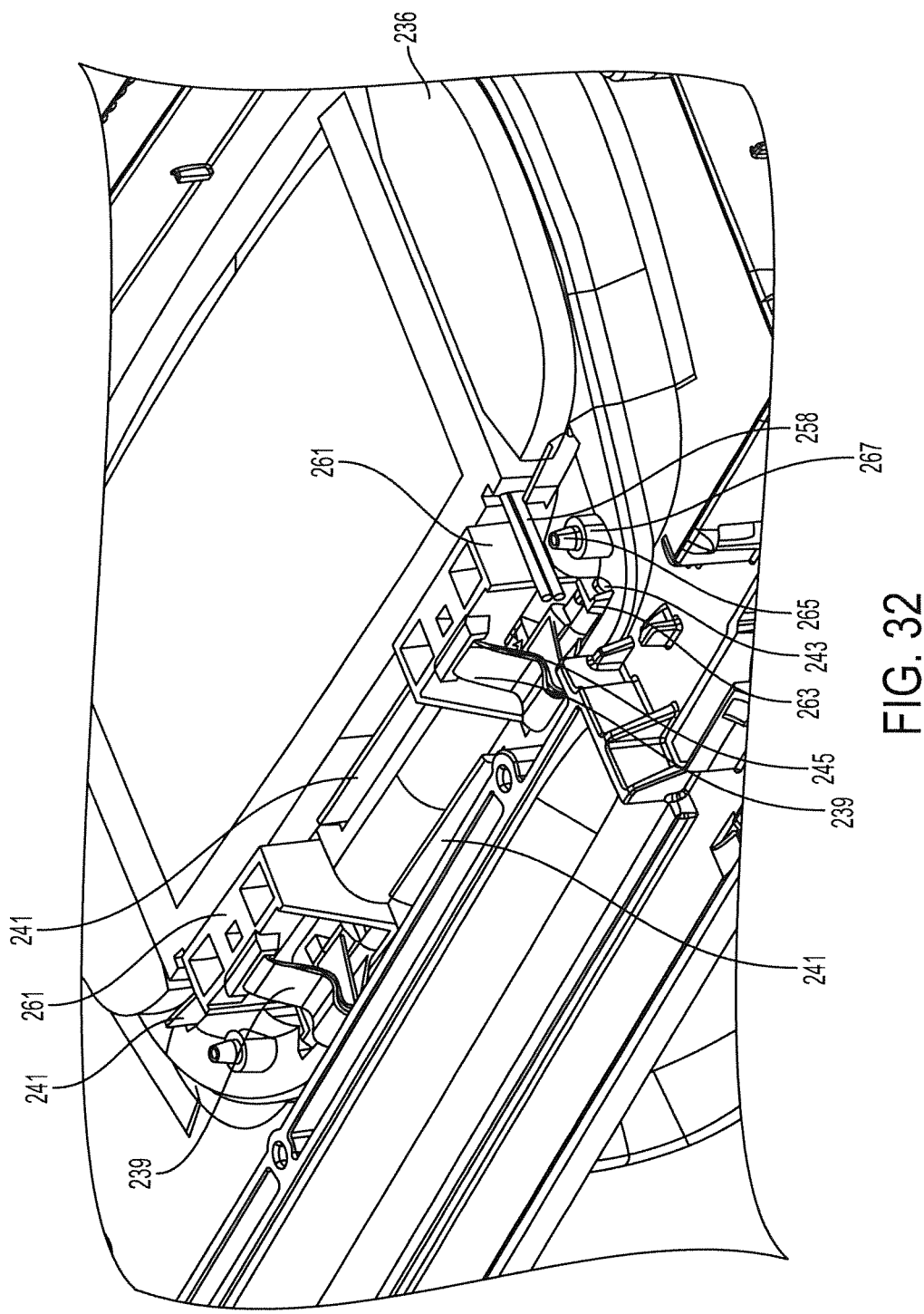
FIG. 32 shows a back view of a visor according to an alternate embodiment of the present invention.
Figure 33:
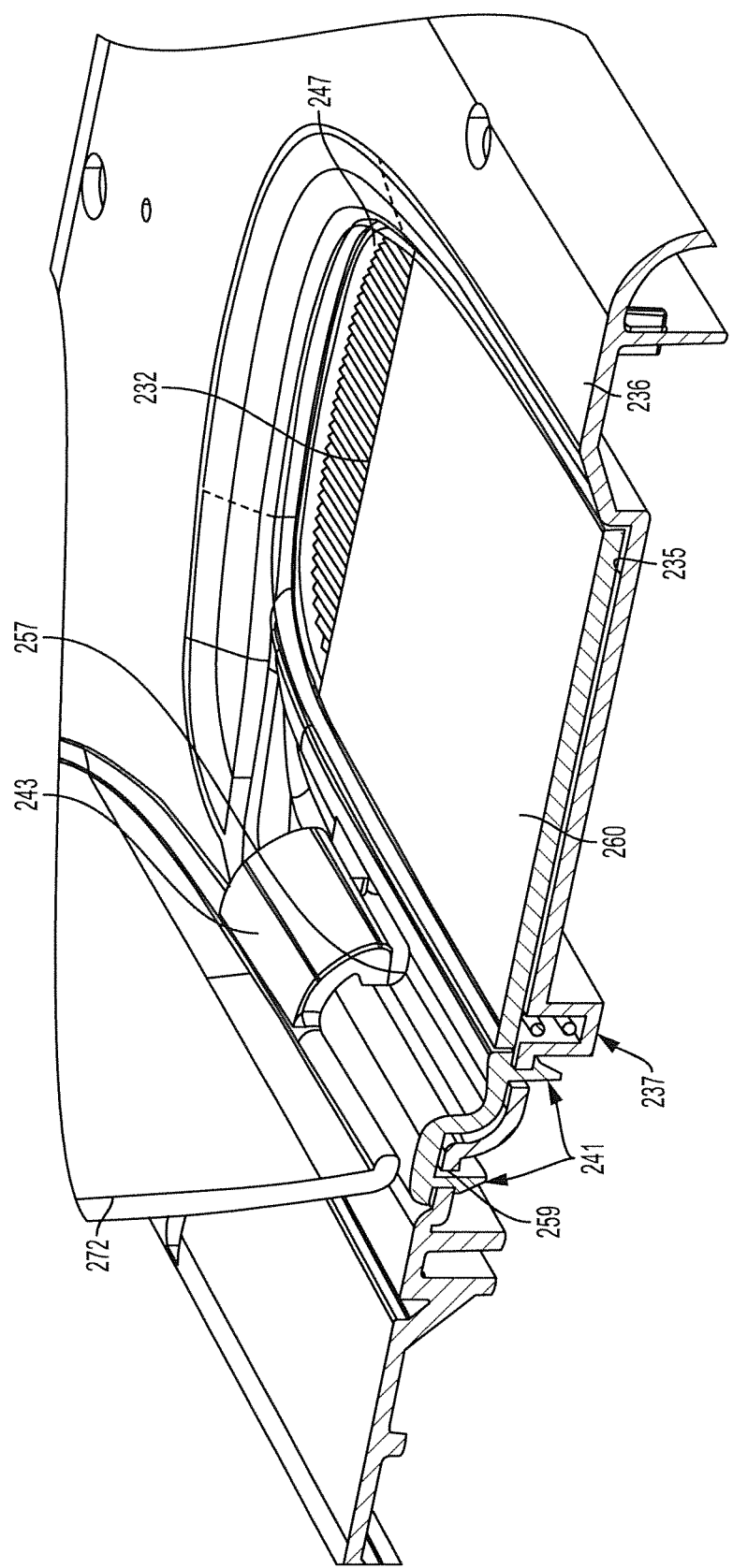
FIG. 33 shows a cross sectional view of a visor according to an alternate embodiment of the present invention.

FIGS. 29 through 33 show an alternate embodiment of an LED visor 230 according to the present invention. Like numerals indicate like parts. The visor 230 of the alternate embodiment may include visor half shells 236 that may include other surfaces that receive and hold components of the sliding visor 230, such as but not limited a pivot rod, a D-ring, a vanity, and covering material arranged over the visor body 242 to complete assembly thereof. The manner in which all of these components described herein are connected to each other and the components used and formed in each of these components are generally the same as those described above. The visor body 242, being composed of a first half shell 236 and a second half shell 238, may allow for a frameless vanity 266 to be secured to the visor body 242, thus allowing for the vanity 266 to be used by an occupant of the vehicle. In one contemplated embodiment, one of the half shells, in this case the first half shell 236, includes a vanity pocket 235 arranged in a predetermined top surface of the first half shell 236. In one contemplated embodiment the vanity pocket 235 is arranged near one end of the visor half shell 236. However, the vanity pocket 235 may be arranged anywhere along the visor half shell surface. The vanity pocket 235 generally has a rectangular shape, although it should be noted that any other shape, including but not limited to oval, circular, square, triangular, or any other shape may be used to form the vanity pocket 235. The vanity pocket 235 may be recessed into the top surface of the visor first half shell 236 a predetermined distance. This distance may allow for all of the components necessary to operate the vanity 266 to be arranged therein and to form an aesthetically pleasing surface for the user of the visor 230 within the vehicle. The vanity pocket 235 may include a plurality of channels formed therein. In one contemplated embodiment the vanity pocket 235 may include a first and second circuit board channel 249 for which a circuit board 270 may be arranged and secured therein for the vanity 266. The vanity pocket 235 may also include a wire harness channel 237 arranged along or near a top end of the vanity pocket 235. In one contemplated embodiment the wire harness channel 237 and the circuit board channels 249 generally have a rectangular shape when viewed from above. It should be noted that any other shaped channel may be used for the channels described herein. The wire harness channel 237 and the first and second circuit board channels 249 are connected to one another and generally form a C shape when viewed from above. It should further be noted that each of the circuit board channels 249 may include a projection member or finger 251 that extends a predetermined distance from an inside surface of each of the circuit board channels 249. These fingers 251 may be used to align and secure the circuit board 270 in a predetermined position with relation to the channel 249. Directly adjacent to the first and second circuit board channel 249 may be a first light guide channel and a second light guide channel 253. The light guide channel 253 generally may mimic the outer shape of the light guide 232, which may be used within the visor 230 according to the present invention. In one contemplated embodiment the light guide channel 253 may have a generally ovular partial shape or a semi circular shape depending on the design and outer edge shape of the light guide 253 for the present invention. It should be noted that in one contemplated embodiment the light guide channel 253 extends a predetermined distance from the bottom of the vanity pocket 235, but not as far as the circuit board channel 249 and wire harness channel 237. However, it is also contemplated to have all of the channels extend the same distance from the bottom of the vanity pocket 235, such that the light guide channel 253, circuit board channel 249, and wire harness channel 237 all extend the same distance from the bottom of the vanity pocket 235. Arranged between each light guide channel 238 and circuit board channel 249 in one contemplated embodiment are a first and second triangular wedge member 255. These wedge members 255 may allow for proper positioning of the circuit board 270 with relation to the light guide 232 such that the wedges may mimic one surface of the light guide 232, thus allowing for the light guide 232 to be securely set within the light guide channel 253 without any movement relative to the visor body 242. It should further be noted that the vanity pocket 235 may include a predetermined angled surface that extends from the top surface of the first half shell 236 of the visor body down to the vanity pocket 235 in any known shape at any known angle.

Arranged within the vanity pocket 235 is a mirror 260. The mirror 260 may have any known shape, such as generally rectangular with curved ends as shown or any other shape. The mirror 260 is generally made of glass with the appropriate coating thereon, however it is also contemplated that the mirror 260 may be made from any other material, such as plastic, composite, natural material, etc. The mirror 260 is arranged such that it is secured to the bottom surface of the vanity pocket 235 via any known connecting methodology. Some of these methodologies may be adhesives, tape, hook and loop connectors, mechanical connectors or any other known chemical or mechanical connecting methodologies. It should be noted that the mirror 260 in one contemplated embodiment may have a first and second clear end 247 arranged at each end thereof. The clear end portion 247 of the mirror 260 may be in any known shape, such as a semi circular or semi ovular shape shown in the drawings. The clear end 247 may extend any distance from the end of the mirror 260 or may be positioned anywhere on the surface of the mirror 260. However, it is also contemplated to have no clear ends on the mirror 260 and/or to have only one clear end 247 on the mirror 260 depending on the design requirement for the visor 230. The use of the clear ends 247 on the mirror 260 may allow for light from a light guide 232, which is illuminated by an LED 264 arranged on the circuit board 270, to illuminate the vanity mirror 260 from underneath the mirror 260. This may allow for the light to pass through the clear ends 247 of the mirror 260 thus illuminating the mirror 260 for the user of the vanity during darkness and at all other times. It should be noted that the shape of the clear ends 247 may be any known shape that is capable of passing light therethrough to illuminate the vanity mirror 260 of the present alternate embodiment. In use, the mirror 260 may be secured to the vanity pocket 235, such that the mirror 260 is arranged over a first and second light guide 232 which are arranged within a first and second light guide channel 253, which are adjacent to a first and second circuit board 270 that are arranged and secured within a first and second circuit board channel 249. The circuit boards 270 are connected electrically to the electrical system of the vehicle, via a wiring harness 258. The wiring harness 258 is arranged within the wire harness channel 237, and is connected to each circuit board 270 on one end thereof while the opposite end of the wiring harness 258 is connected to the electrical system of the vehicle. As described above any type of switch may be used to control the power of the LED 264, such as a plunger switch, or a mechanical switch in which the user chooses to turn the light on or off manually. As noted above, the light guide 232 may be arranged on each end of the vanity pocket 235, on just one end of the vanity pocket 235 or in no portion of the vanity pocket 235. The light guide 232 as described above may be of any known shape, thickness and may or may not be used in the present invention. The LED 264 is arranged on the circuit board 270 and the circuit board 270 is connected to the electrical system of the vehicle as described above in previous embodiments.

The alternate embodiment visor 230 may also include a door mounting panel 231. The door mounting panel 231 or member may snap directly into the first half shell 236 of the visor body 242. The door mounting panel 231 generally has a rectangular shape with curved ends at each end thereof. This generally forms a wing like shape when viewed from above. The door mounting panel 231 generally has an S shape when viewed in cross section. The door mounting panel 231 may include in one contemplated embodiment a first and second orifice 257 therethrough for receiving a door hinge 243 of a door 272 for the vanity 266. The orifice 257 may be of any known shape, but generally is of a rectangular shape when viewed from above. In one contemplated embodiment, a first and second orifice 257 for the door hinges 243 are arranged through the door mounting panel 231. Generally, two door hinges 243 are arranged from a top surface of the door 272, one near or at an end thereof and the other near or at the other end thereof. However, it should be noted that a single door hinge 243 is contemplated to be used and also multiple door hinges, i.e., more than two, are also contemplated to be used with the door mounting panel 231. The door mounting panel 231 may also include panel snap or snap locking members 241 arranged from a bottom surface of the door mounting panel 231. The panel snap members 241 generally are rectangular in shape and include a triangular wedge at the end thereof. The triangular wedge may form a locking shoulder that may interact with a locking surface of the first visor half shell 236 according to the present invention. The locking shoulder of the panel snaps 241 may allow for the door mounting panel 231 to be pushed through the substrate orifices and interengage therewith. The length of the door mounting panel 231 generally extends almost the entire width of the vanity pocket 235. In the embodiment shown it is a little less than the width of the vanity pocket 235, such that the vanity pocket 235 has an angled surface that tapers down towards the end of the door mounting panel 231. A plurality of panel locking snaps 241 are arranged from a bottom surface thereof. In the embodiment shown three multi sized snaps 241 are arranged along a first edge of the bottom surface of the door mounting panel 231 and a single panel snap 241 is arranged along the opposite edge of the door mounting panel 231. It should be noted that the first half shell 236 has a plurality of locking slots or orifices 259 arranged therethrough. Generally, the locking slots 259 have a rectangular shape when viewed from above, however any other known shape may be used for the locking slots 259. The locking slots 259 may be used to receive and secure against a locking surface of the locking shoulder of the door mounting panel snap lock members 241, such that an interengagment between the locking shoulder and locking slots occurs. The panel locking snaps 241 generally have a predetermined co-efficient of flexibility that may allow for the panel locking snap members 241 to bend in order to interengage the locking shoulder thereof with the locking surface of the locking slot 259 in a snap type arrangement. The door mounting panel 231 may also include a first and second door connector member 261. The door connector members 261 generally may be arranged from a bottom surface of the door mounting panel 231. The door connector member 261 generally may have a first and second leg interconnected by a cross member therebetween. The cross member may have a first and second pocket arranged in a top surface thereof, along with a smaller pocket arranged through a surface thereof. The door connector member 261 may also include in a side surface of the cross member a spring pocket 245, which may be used to secure one end of a spring 239, for the door 272, within the spring pocket 245. It should be noted that the door connector member 261 may also include a flange 263 extending from one of the legs thereof that includes an orifice through a predetermined portion thereof. This orifice may be used to have a hinge 243 arranged therethrough in order for the door 272 to pivot about a predetermined axis between an open and closed position over the mirror 260. In the embodiment shown, two door connector members 261 are arranged from the bottom surface of the door mounting panel 231. It should further be noted that the door mounting panel 231 may also have the cross member formed as a solid member without the pockets in the top surface thereof, with only the spring pocket 245 arranged through a side surface of the cross beam of the door connector member 261. It should be noted that the door 272 may have any known dimensions and any known shape, such that it is a shape that mimics the general shape of the vanity pocket 235, thus concealing the mirror 260 thereunder during closure of the door 272 on the visor body 242. As shown in the embodiment, it is generally ovular or a rectangular shaped wherein the door 272 has a predetermined indentation arranged at a bottom surface thereof for easy opening and closing of the door 272 by the user of the vehicle. The door 272 may also include a first and second hinge 243 arranged off the top end of the door 272. It should be noted that any other number of hinges including one or more than two may also be used depending on the design of the visor 230 according to the present invention. The door hinge 243 may generally have a U shaped when viewed in cross section. The door hinge 243 may include a dowel or pin arranged at one end thereof. This pin may be arranged through the orifice of the door connector member 261 arranged on each end thereof allowing for a pivot point, such that the door 272 may pivot about the hinge to allow for the door 272 to open to expose the mirror 260 for viewing and to close and shut the mirror 260 from viewing by the user of the vehicle. The door spring 239, as described above, generally has a C or U shape when viewed from a side. The second end of the door spring 239 may be engaged with a cam surface arranged on the door hinge 243 near a generally center portion of the door hinge 243. This may allow for the opening and closing of the door in a controlled and easy effort manner without any extraneous noise. It should be noted that the door spring 239 shown includes a split end on one end thereof. This split end may have one portion of the split end engage with a top surface of the cam of the door hinge 243 and a second portion engaged with a bottom surface of the cam of the door hinge 243. This split end for the door spring 239 may allow for the easy opening and closing efforts along with reduced noise. It should be noted that the door spring 239 may be made of any known material, but in one preferred embodiment is made of a metal material, however any other plastic, composite, or natural material may also be used. It is also contemplated to use any other type of plastic, metal, ceramic, composite or natural material for any of the other parts herein. It should further be noted that it is also contemplated to use at least one cylindrical lock or alignment member 265 extending from a bottom surface of the door mounting panel 231. These are generally arranged near each outer end of the door mounting panel 231. The cylindrical lock members 265 generally may have a tapered head that is capable of interengaging with a locking surface of the first half shell 236. The first half shell 236 may include a first and second cylindrical orifice 267 therethrough which may align with and interengage with the cylindrical locking members 265 of the door mounting panel 231. It is also contemplated that one door connecting member 261 may be used along with one hinge 243 arranged near a center of the vanity pocket 235.

Figure 35:
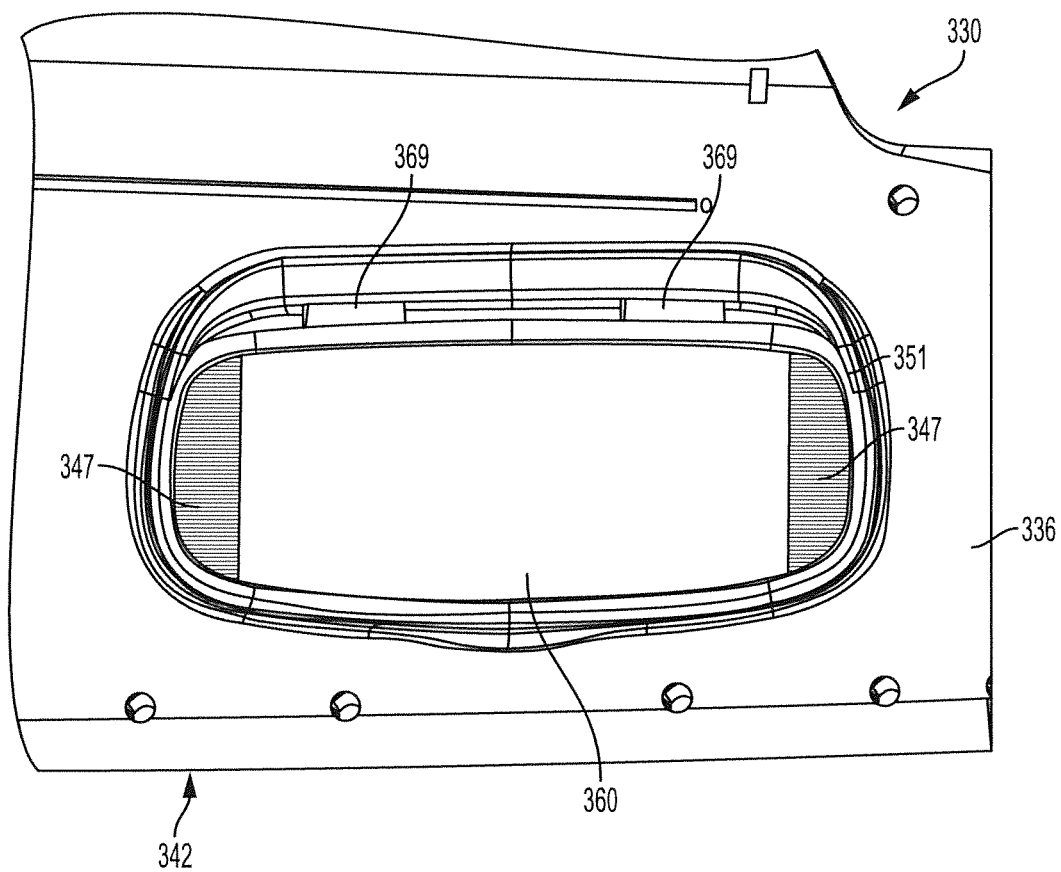
FIG. 35 shows a top view of a visor according to an alternate embodiment of the present invention.
Figure 34:
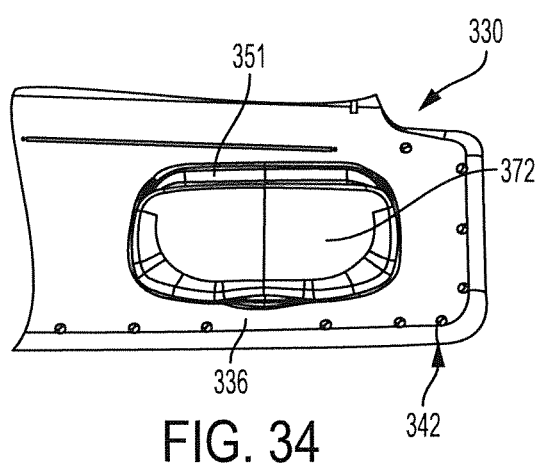
FIG. 34 shows a plan view of a visor according to an alternate embodiment of the present invention.
Figure 36:
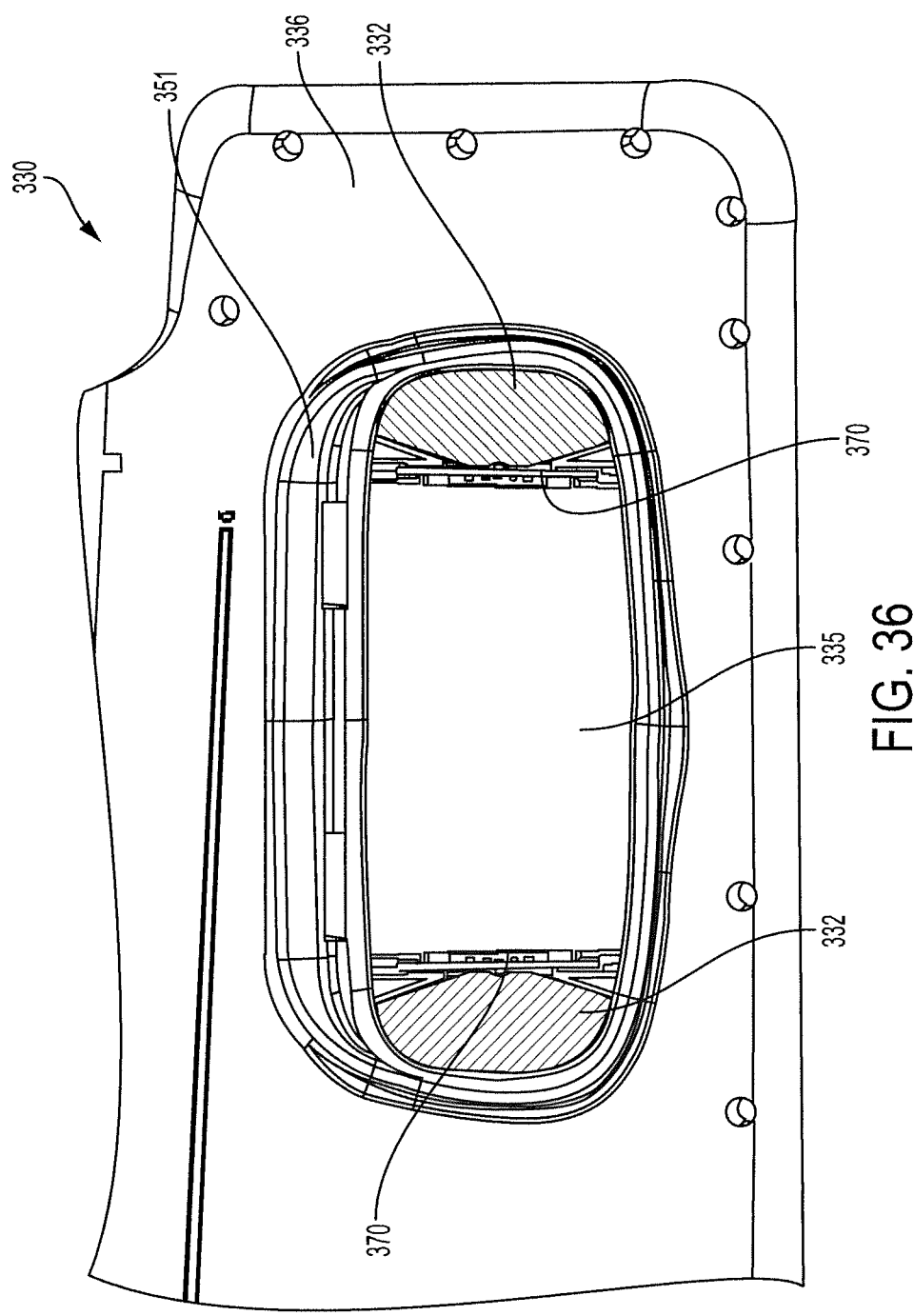
FIG. 36 shows a top view of a visor according to an alternate embodiment of the present invention.
Figure 37:
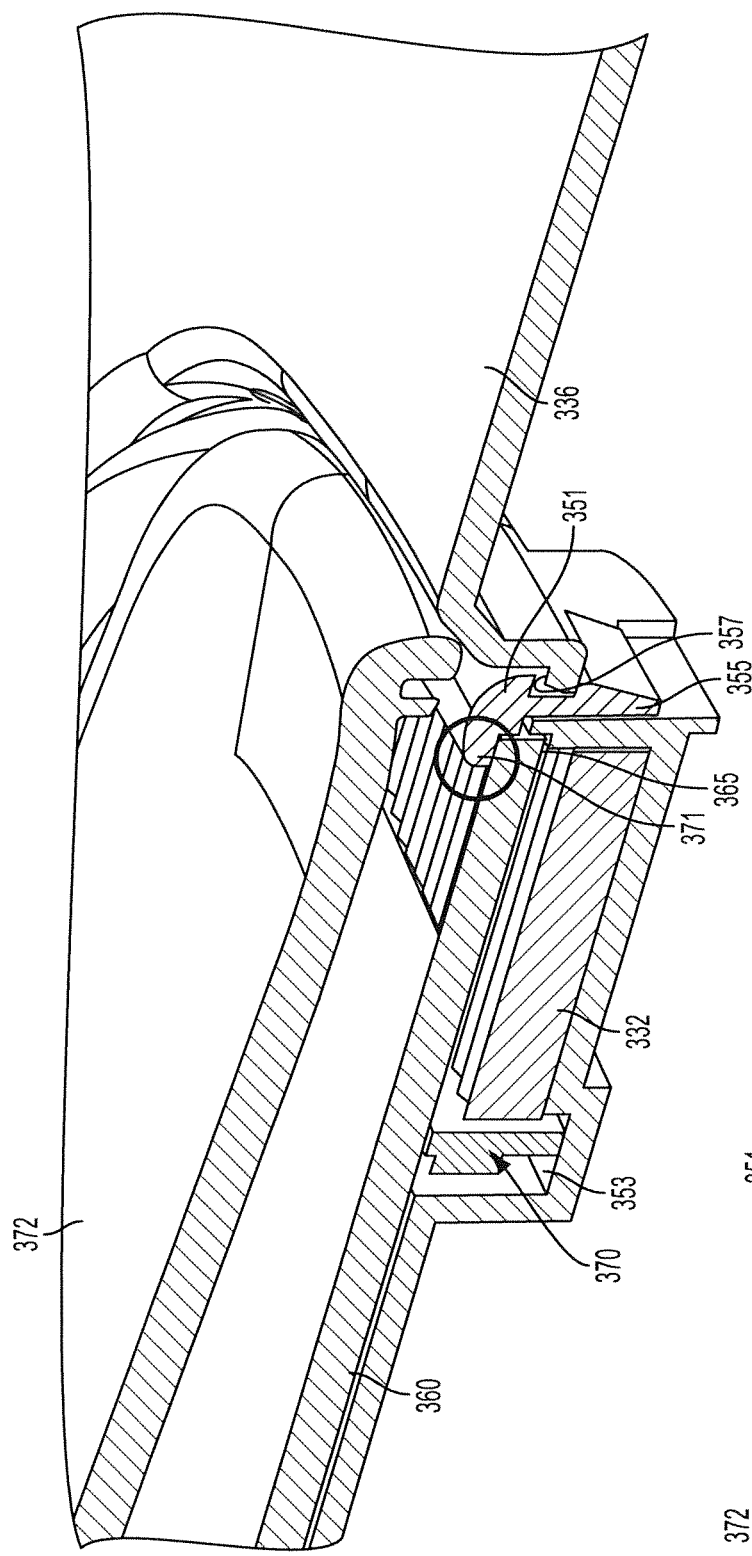
FIG. 37 shows a cross sectional view of a visor according to an alternate embodiment of the present invention.
Figure 38:
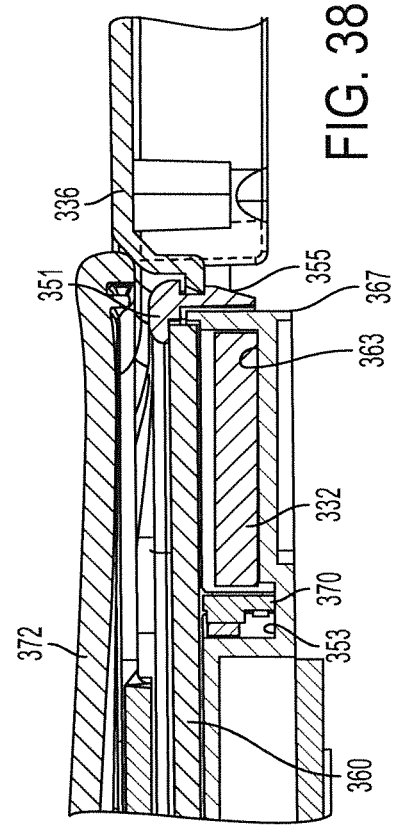
FIG. 38 shows a cross sectional view of a visor according to an alternate embodiment of the present invention.
Figure 39:
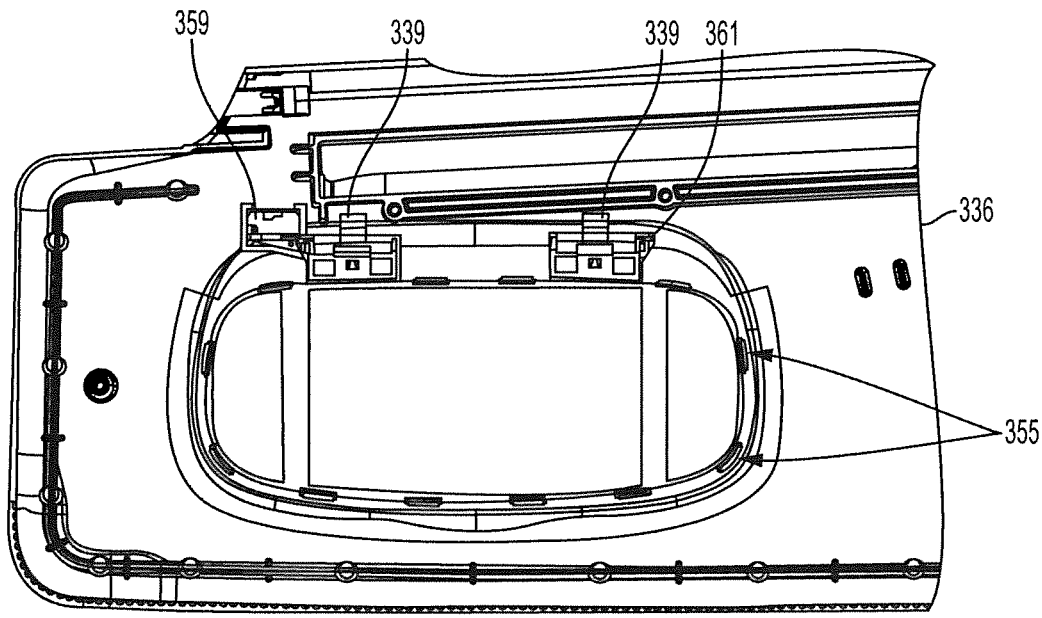
FIG. 39 shows a bottom view of a visor according to an alternate embodiment of the present invention.
Figure 40:
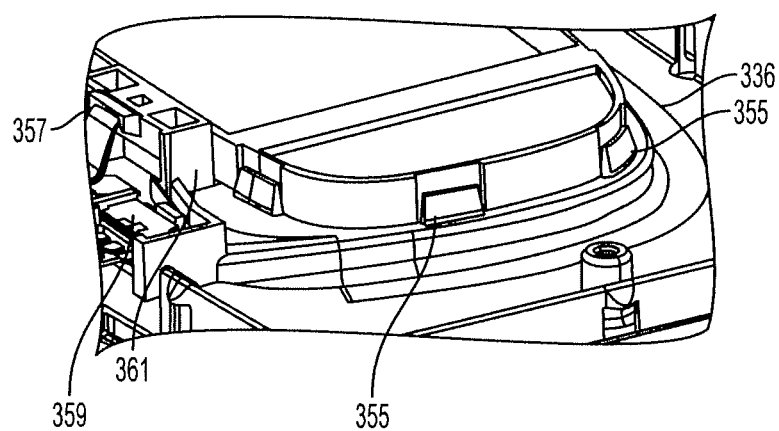
FIG. 40 shows a bottom view of a visor according to an alternate embodiment of the present invention.

FIGS. 34 through 40 shows yet another alternate embodiment of a visor 330 according to the present invention. Like numerals indicate like parts. This alternate embodiment includes a first half shell 336 and a second half shell formed together to create a visor body 342. The visor half shells may include many other surfaces that receive and hold various components of the visor 330, such as but not limited to a pivot rod, a D ring, a vanity 366, and covering material arranged over the visor body 312 to complete assembly thereof, such as those described above. The visor 320 in this alternate embodiment may have a first half shell 336 with a vanity pocket 335 arranged therein. The vanity pocket 335 generally may have the overall outer shape of the vanity frame 351, which is used to connect the vanity 366 to the visor body 342. In the embodiment shown it is generally a rectangular shape with rounded edges. However, any other shape, such as a rectangle, square, circular, oval, triangular or any other known shape may be used for the vanity 366 and the vanity pocket 355 described herein. The vanity pocket 335 may extend a predetermined distance from the top surface of the first half shell 336. The vanity pocket 335 may also include a first and second circuit board channel 353 and a first and second light guide channel 363 arranged therein. The first and second channels 353, 363 generally are arranged near each outer end of the vanity pocket 325. In the embodiment shown the light guide channel 363 does not extend as far from the top surface of the first half shell 336 as the circuit board channel 353. As described above the circuit board channel 353 generally has a rectangular shape when viewed from above, and the light guide channel 363 generally has a semi circular shape or D shape when viewed from above. The light guide 332 may be placed within the light guide channel 363 such that the bottom surface of the light guide 332 interacts and engages with a top surface of the light guide channel 363 and it may align with the circuit board 370, which is placed and secured within the circuit board channel 353, such that the LED light connected to the circuit board 370 may illuminate the light guide 332 as described above. The outer periphery of the light guide 332 may mimic the periphery of the light guide channel 363, such that the light guide 332 does not move with relation to the visor body 342. The generally same design as described above for the circuit board 370 may also be used in this embodiment, so that the circuit board 370 does not move within the circuit board channel 353, thus ensuring proper alignment of the LED to the light guide 332. In the embodiment shown for this alternate embodiment a wire harness channel is not used. However, it also may be incorporated into the present design depending on the design requirements. Hence, the circuit board channels 353 are parallel to one another and each are arranged near an end or a predetermined distance from the actual end of the vanity pocket 335. The vanity pocket 335 may also include a flange or shoulder 357 arranged around an entire inner circumferential periphery thereof. A mirror flange 365 is arranged adjacent to the flange 357. The mirror flange 365 generally may mimic the outer shape of the mirror 360 and may allow for the outer edge of the mirror 360 to sit on the mirror flange 365 within the vanity pocket 335. The flange 357 may be parallel to the top surface of the first half shell 336. The flange 357 may include a plurality of locking slots 367 arranged at predetermined intervals around the entire periphery circumference of the vanity pocket flange 357. Generally, these locking slots 367 may be rectangular when viewed from above, however any other shaped locking slot may be used and any number of locking slots may also be arranged in any known manner around the vanity pocket flange 357.

The visor 330 also includes a vanity frame 351. The vanity frame 351 generally may have a rectangular shape with curved ends. This shape may mimic the outer shape of the vanity pocket 335 and hence may be any known shape. The vanity frame 351 may also include at least one, but in the embodiment shown, two slots 369 through which a door hinge may be attached thereto. Hence, the top portion of the vanity frame 351 may be wider than the two side portions and bottom portion of the vanity frame 351. Extending from a bottom surface of the vanity frame 351 may be a plurality of mirror frame snap or lock members 355. The mirror frame lock snap members 355 generally may be rectangular with a wedge or triangular shape end thereon. The triangular shape end may form a locking shoulder for the mirror frame locking snap 355. This locking shoulder may interengage with a locking surface arranged through the locking slots 367 of the vanity pocket flange 357. Hence, the locking shoulder may interengage with a bottom surface of the vanity pocket flange 357 to secure the vanity frame 351 to the visor body 342. It should be noted that the mirror frame locking snaps 355 may be arranged in any known pattern around the outer circumference of the vanity frame 351. The mirror frame locking snaps 355 may align with and interengage with the locking slots 367 arranged through the vanity pocket flange 357 as described above. The mirror frame locking snaps 355 may have any known width and length. In the embodiment shown a total of twelve vanity mirror frame locking snaps 355 are arranged at predetermined positions around the vanity frame 351. Hence, the number of locking slots 367 is the same as the number of locking snaps 355 and the locking slots 367 are arranged through the first half shell 336. Arranged from the wider top portion of the vanity frame 351 maybe a first and second door connector member 361. The door connector members 361 are generally the same as those described above for the other embodiments. Hence, the door connector members 361 may have a generally circular channel that is capable of receiving a pin of the hinge of the door 372 such that the door 372 may be pivotally connected to the door connector member 361 and hence to the visor body 342. It should be noted that the first half shell 336 may have a first and second orifice that generally have a rectangular shape when viewed from above, which may allow for the first and second door connector member 361 to extend therethrough. This may allow for the vanity frame 351 to snap in and be connected and secured to the visor body 342. It should be noted that this snap in system may allow for easy installation of the vanity 366 into the visor 330 of the automotive vehicle. In the embodiment shown an electrical connector 359 is arranged adjacent to one of the door connector members 361 and secured via any known connecting methodology to an inside surface of the first visor half shell 359. The electrical connector 359 is then connected to an electrical system of the vehicle and connected to the circuit boards 378 electrically such that power is provided to the LEDs for providing a lighted and illuminated mirror 360 for the visor 330. It should be noted that the mirror 360 generally is the same as the mirror described above in that it might have two clear ends on each end thereof, one clear end on an end thereof or no clear ends, depending on the design requirements for the vanity 366. It should further be noted that the vanity frame 351 also may include a mirror flange 371 arranged around an inner periphery of the vanity frame 351. The mirror flange 371 generally may have an oval shape or a rectangular shape with curved ends to mimic the inner diameter of the inner circumference of the vanity frame 351. The mirror flange 371 generally maybe parallel to a top surface of the first half shell 336. The mirror flange 371 may in part be used to secure the mirror 360 within the visor body 342. In one contemplated embodiment the mirror 360 may be held in place and secured within the visor body 342 mechanically by the mirror flange 371 of the vanity frame 351 engaging with and securing the mirror 360 within the vanity pocket 335 of the first half shell 336. Hence, the bottom of the mirror 360 may be arranged and in contact with a surface of the vanity pocket 335 while the mirror 360 is also in contact with the mirror flange 371, which may be arranged along an inner periphery of the vanity frame 351. Hence, when the vanity frame 351 is snapped into the visor first half shell 336, it may in turn secure the mirror 360 in position with relation to the light guide 332, circuit board 370, door 372 and visor body 342. It should be noted that all of the components, except for the door spring 339, may be made of a plastic material, however any other metal, ceramic, composite or natural material may also be used for any of these components. The same may also apply for the door spring, which may be made of any known metal, plastic, ceramic, composite or natural material. It should further be noted that the door 372 and door hinge system generally are the same as those described above for the other alternate embodiment. The vanity frame locking snap 355 in one embodiment generally may have four locking snaps 355 arranged at predetermined positions along the first long edge and second long edge and two locking snaps 355 generally arranged at a predetermined position on the shorter length edges of the vanity frame 351. However, any other number of locking snap members 355 may also be used and in any type of set up or positioning.

Therefore, in operation, the two alternate embodiments of the visor may be easier to manufacture and easier to have the vanities installed therein via the snap in locking systems deployed in both the frameless vanity and the locking vanity frame embodiments. Such easy installation of the vanities within the visor bodies may reduce manufacturing time and reduce the overall costs for the manufacturer while also allowing the reduction in costs of materials as the clear ends of the mirror may allow for the removal of lens and the associated hardware to connect lens to be arranged over the light guides or LEDs of the present invention.

The present invention has been described in an illustrative manner. It is to be understood that the terminology which has been used is intended to be in the nature of words of description rather than that of limitation.

Many modifications and variations of the present invention are possible in light of the above teachings. Therefore, within the scope of the appended claims, the present invention may be practiced otherwise than as specifically described.

What is claimed is:

1. A visor for use in a vehicle, said visor comprising:
   a pivot rod;
   a first and second shell being engageable to form a visor body, said first shell having a vanity pocket arranged therein, said vanity pocket having a first flange, said vanity pocket having a second flange arranged adjacent to said first flange;
   a mirror having at least one clear end, said mirror secured within said vanity pocket by a vanity frame, a locking member of the vanity frame arranged through a locking slot of the vanity pocket such that a bottom surface of said mirror contacts said second flange, a top surface of said mirror is engaged with an inward extending flange of said vanity frame, and the vanity frame is engaged with the first flange;
   a circuit board arranged within a first channel of said vanity pocket;
   a light guide arranged adjacent to said circuit board, said light guide positioned underneath said clear end of said mirror; and
   a light emitting diode connected said circuit board.

2. The visor of claim 1 wherein the locking member extending from a bottom surface of said vanity frame, said bottom surface of said vanity frame engages with said first flange.

3. The visor of claim 2 wherein the locking slot being one of a plurality of locking slots arranged around an outside circumference of said vanity pocket.

4. The visor of claim 3 wherein said locking slots interact with and engage with said vanity frame snaps to secure said vanity to said visor body.

5. The visor of claim 3 wherein said plurality of locking slots are arranged in said first flange.

6. The visor of claim 1 wherein said inward extending flange is arranged from an inner periphery of said vanity frame.

7. The visor of claim 6 wherein said inward extending flange secures said mirror within said vanity, said inward extending flange engages said mirror around an entire outer edge of said mirror.

8. The visor of claim 1 further comprising a door pivotally connected to said vanity frame.

9. The visor of claim 1 wherein said light guide is arranged within a second channel of said vanity pocket, a bottom surface of said light guide engages with a surface of said second channel.

10. The visor of claim 1 wherein said mirror having said clear end on both ends thereof.

11. The visor of claim 1 wherein said light emitting diode illuminates said light guide, said light guide is illuminated from under said mirror.

* * * * *